(12) United States Patent
Nanjyo et al.

(10) Patent No.: US 7,777,935 B2
(45) Date of Patent: Aug. 17, 2010

(54) ACTUATOR, AND ACTUATOR ARRAY

(75) Inventors: Takeshi Nanjyo, Hyogo (JP); Seiichi Katoh, Miyagi (JP); Koichi Ohtaka, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 342 days.

(21) Appl. No.: 11/776,305

(22) Filed: Jul. 11, 2007

(65) Prior Publication Data

US 2008/0018982 A1 Jan. 24, 2008

(30) Foreign Application Priority Data

Jul. 18, 2006 (JP) .............................. 2006-196015
Feb. 9, 2007 (JP) .............................. 2007-030907

(51) Int. Cl.
G02B 26/00 (2006.01)
G02B 26/12 (2006.01)
G02F 1/1335 (2006.01)
G02F 1/1343 (2006.01)

(52) U.S. Cl. .................... 359/290; 359/291; 359/212.1; 359/224.1; 257/345; 257/415; 257/486; 349/113; 349/139; 438/52; 216/11

(58) Field of Classification Search ......... 359/290–295, 359/298, 245, 254, 212.1, 224.1, 226.2; 349/27, 38, 110, 113, 114, 139; 257/415, 257/481, 484, 486, E21.345; 216/11, 24; 438/29, 52, 53, 241, 303; 335/78; 361/207; 200/181; 73/514.32; 427/162

See application file for complete search history.

(56) References Cited

U.S. PATENT DOCUMENTS

| 4,423,401 A | * | 12/1983 | Mueller ........................ 337/107 |
| 5,439,835 A | * | 8/1995 | Gonzalez ..................... 438/241 |
| 5,706,067 A | * | 1/1998 | Colgan et al. ................ 349/114 |
| 5,768,006 A | * | 6/1998 | Min et al. ..................... 359/290 |
| 6,424,388 B1 | * | 7/2002 | Colgan et al. ................. 349/27 |
| 6,525,389 B1 | * | 2/2003 | Ahmed ......................... 257/486 |
| 6,717,229 B2 | * | 4/2004 | Buchanan et al. ........... 257/475 |
| 6,869,170 B2 | * | 3/2005 | Shimada et al. .............. 347/68 |
| 6,900,915 B2 | | 5/2005 | Nanjyo et al. |
| 7,050,217 B2 | | 5/2006 | Nanjyo et al. |
| 7,064,878 B2 | | 6/2006 | Nanjyo et al. |
| 7,099,060 B2 | | 8/2006 | Nanjyo et al. |

(Continued)

FOREIGN PATENT DOCUMENTS

JP 2004-78136 3/2004

(Continued)

*Primary Examiner*—Loha Ben
(74) *Attorney, Agent, or Firm*—Oblon, Spivak, McClelland, Maier & Neustadt, L.L.P.

(57) ABSTRACT

An actuator is disclosed that has a contacting part smaller than a processing limit of a lithography technique, and is able to reduce a contacting area or a contacting length of the contacting part during operation, reduce a sticking force induced by contact, and decrease a driving voltage of the actuator. The actuator includes an operating part and a contacting part in contact with the operating part. The contacting part is formed by overlapping a first pattern on an end of a second pattern. The first pattern has a solid structure and the size of an upper portion of the solid structure of the first pattern on the second pattern is less than a processing resolving power or resolution.

6 Claims, 22 Drawing Sheets

U.S. PATENT DOCUMENTS

| | | |
|---|---|---|
| 7,113,321 B2 | 9/2006 | Nanjyo et al. |
| 7,166,486 B2 | 1/2007 | Ohtaka et al. |
| 7,167,290 B2 | 1/2007 | Katoh et al. |
| 7,215,452 B2 | 5/2007 | Nanjyo et al. |
| 7,468,766 B1 * | 12/2008 | Colgan et al. ............... 349/113 |
| 7,567,324 B2 * | 7/2009 | Lee et al. .................... 349/139 |
| 2005/0248862 A1 | 11/2005 | Nanjo et al. |
| 2006/0103912 A1 | 5/2006 | Katoh et al. |
| 2006/0104597 A1 | 5/2006 | Nanjo et al. |
| 2006/0109539 A1 | 5/2006 | Katoh et al. |
| 2006/0171015 A1 | 8/2006 | Nanjyo et al. |
| 2006/0239009 A1 | 10/2006 | Nanjyo et al. |
| 2007/0091416 A1 | 4/2007 | Katoh et al. |
| 2008/0278787 A1 * | 11/2008 | Sasagawa ................... 359/224 |
| 2008/0278788 A1 * | 11/2008 | Sasagawa ................... 359/224 |

FOREIGN PATENT DOCUMENTS

| | | |
|---|---|---|
| JP | 2004-138881 | 5/2004 |
| JP | 2006-133394 | 5/2006 |

* cited by examiner

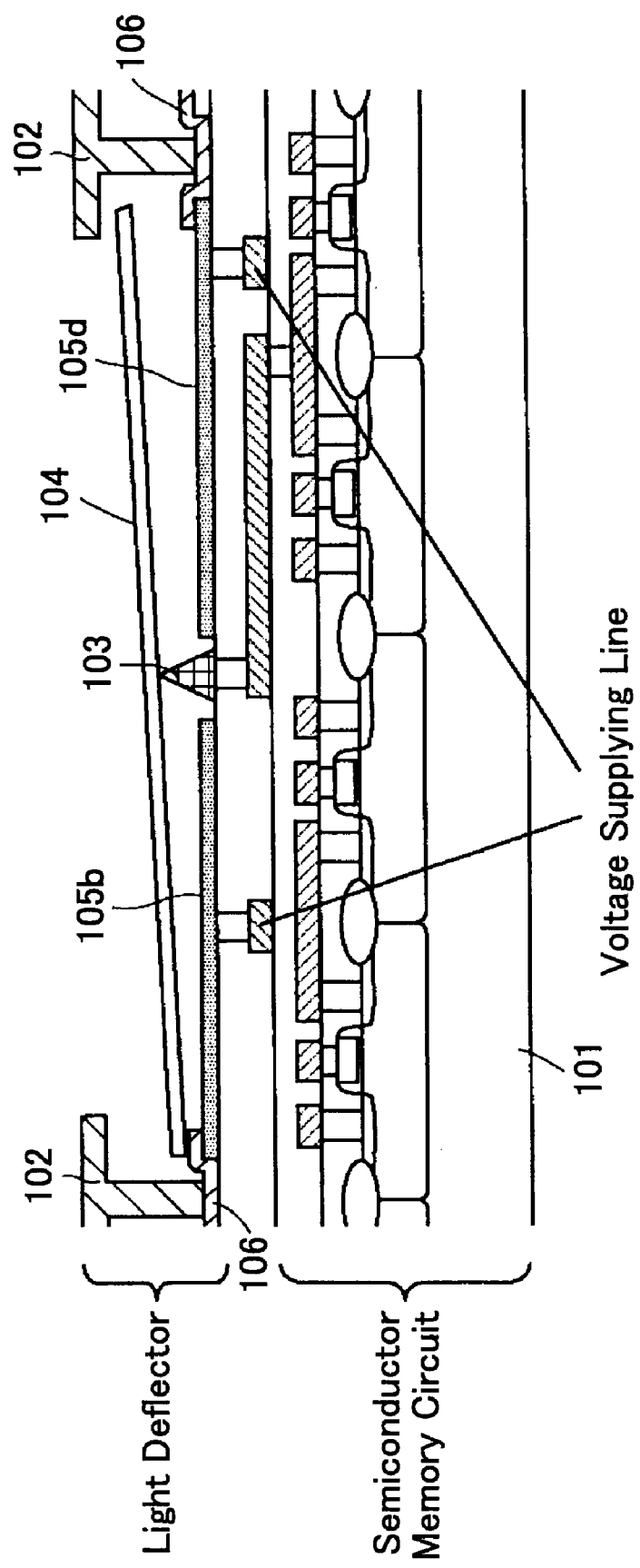

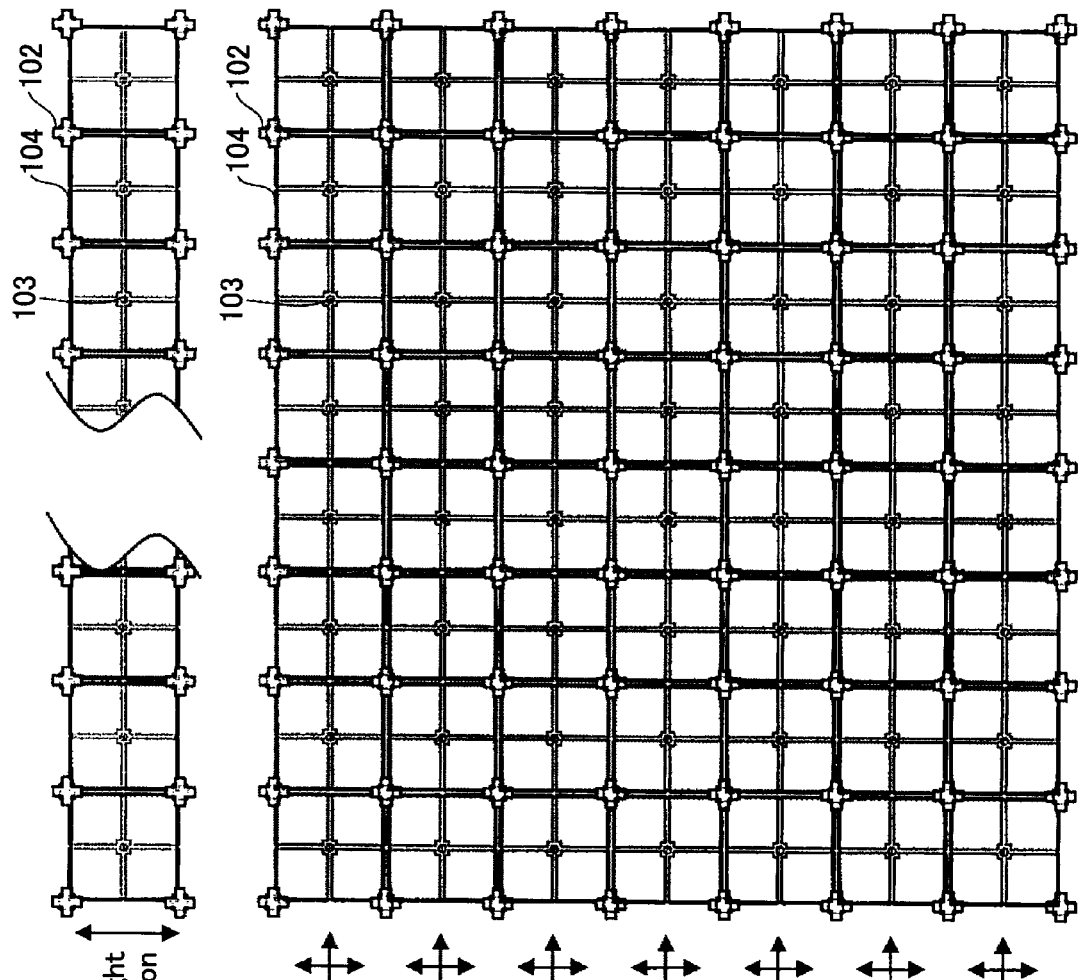

FIG.17

(Unit: Volt)

|  | Electrode 105a | Electrode 105b | Electrode 105c | Electrode 105d | Supporting Member 103 |
|---|---|---|---|---|---|
| Inclined In Direction 1 | X | X | 0 | 0 | 0 |
| Inclined In Direction 2 | X | X | 0 | 0 | X |
| Inclined In Direction 3 | X | 0 | X | 0 | X |
| Inclined In Direction 4 | X | 0 | X | 0 | 0 |

Contacting Part (Line Contact)

Contacting Part (Line Contact)

ACTUATOR, AND ACTUATOR ARRAY

BACKGROUND OF THE INVENTION

1. Field of the Invention

The present invention relates to an actuator which acts as a light deflector, and includes a plate member, such as a mirror, operating on a substrate, and provides predetermined functions with the plate member in operation, a method of producing the actuator, an optical system using the actuator, and an image forming device.

2. Description of the Related Art

Various kinds of light deflection methods, light deflection devices, and methods of fabricating the light deflection devices have been proposed. For example, Japanese Laid-Open Patent Application No. 2004-78136 (hereinafter referred to as "reference 1") discloses a light deflection device in which a plate member (such as a mirror) without a fixed end is confined in a space, and is inclined with a supporting member at a center by an electrostatic attractive force to deflect incident light in one axial direction or two axial directions.

In other light deflection devices disclosed in reference 1, a contacting voltage is applied to the plate member (for example, the mirror), or, the plate member is electrically floating (held up by electrostatic force). Reference 1 also discloses light deflection methods of the light deflection devices, respectively, namely, methods for driving the respective light deflection devices.

A typical structure of the light deflection device and a typical driving method thereof disclosed in reference 1 are briefly described below.

FIG. 16A through FIG. 16D are a plan view and cross-sectional views illustrating a structure of a light deflection device disclosed in reference 1.

Specifically, FIG. 16A is a plan view of the light deflection device, FIG. 16B is a cross-sectional view along an AA' line in FIG. 16A, FIG. 16C is a cross-sectional view along a BB' line in FIG. 16A, and FIG. 16D is a cross-sectional view along a CC' line in FIG. 16A. Note that the light deflection device shown in FIG. 16A through FIG. 16D corresponds to one actuator of a two dimensional light deflecting array including plural actuators.

As shown in FIG. 16A through FIG. 16D, the light deflection device includes a substrate 101, plural regulation members 102, a supporting member 103, a plate member 104, and plural electrodes 105a, 105b, 105c, and 105d.

The regulation members 102 are arranged at corners of the substrate 101, respectively, and each of the regulation members 102 has a stopper at its top.

The supporting member 103, which is arranged on the surface of the substrate 101, has a top part formed of a conductive material.

The plate member 104 does not have a fixed end, namely, the plate member 104 is not fixed. On the upper portion of the plate member 104 there are a light reflecting area and a conductive layer formed from a member with at least a conductive part. At the bottom of the plate member 104 at least a contacting part, which is in contact with the top of the supporting member 103, is formed of a conductive member. The plate member 104 is movably arranged in the space surrounded by the substrate 101, the supporting member 103, and the stoppers of the regulation members 102. The voltage on the plate member 104 is supplied through contact with the supporting member 103.

The electrodes 105a, 105b, 105c, and 105d are arranged on the substrate 101, and are substantially opposite to the conductive layer of the plate member 104.

In the above light deflection device, because of a combination of voltages applied on the electrodes 105a, 105b, 105c, 105d, and the supporting member 103, as shown in FIG. 16C and FIG. 16D, the plate member 104 is inclined in four directions. The four directions are indicated as "direction 1", "direction 2", "direction 3", and "direction 4" in FIG. 16C and FIG. 16D. Therefore, for example, when a light beam is incident in a direction perpendicular to the surface of the substrate 101, the plate member 104 reflects the incident light beam in the four directions. On the contrary, when four light beams are incident respectively in the four directions, the plate member 104 reflects the incident light beams in the direction perpendicular to the surface of the substrate 101.

FIG. 17 is a table illustrating a relationship between the combination of the voltages applied on the electrodes 105a, 105b, 105c, and 105d and the inclination direction of the plate member 104 in the light deflection device in FIG. 16A through FIG. 16D.

As shown in FIG. 17, two voltages, specifically, a voltage of X volts and a voltage of 0 V, are appropriately applied on the four electrodes 105a, 105b, 105c, and 105d, and the supporting member 103. Due to this combination of the applied voltages, the plate member 104 is able to reflect the incident light beam in the four directions.

The light deflection device disclosed in reference 1 has the following advantages.

Since the inclined angle of the plate member 104 is determined by contact between the substrate 101, the supporting member 103, and the plate member 104 (such as a mirror), it is easy to stably control the deflection angle of the mirror.

Since different voltages are applied on opposite electrodes with the supporting member 103 as a center, the thin plate member 104 can be rotated at high speed so that the response speed of the light deflection device is high. Further, since the plate member 104 does not have a fixed end, twisted deformation or other deformation does not occur in the plate member 104, and there is little long-term degradation of the plate member 104; hence the plate member 104 can be driven at a low voltage.

Since a tiny and lightweight plate member 104 can be fabricated by semiconductor processes, there is little shock caused by impact between the stopper of the regulation members 102 and the plate member 104; thus there is little long-term degradation of the plate member 104.

In addition, by appropriately determining the structure of the regulation members 102, the plate member 104, and the light reflecting area, it is possible to improve the ratio of the reflected light in an ON condition and the reflected light on an OFF condition, that is, an S/N ratio in a still image device, or a contrast ratio in a video device.

Since semiconductor processes and semiconductor process apparatuses can be used to fabricate the light deflection device, it is possible to reduce the size of the device and increase the degree of integration at low cost.

Further, since the electrodes 105a, 105b, 105c, and 105d are arranged with the supporting member 103 as a center, it is possible to perform one-axis two-dimensional light deflection and two-axis three-dimensional light deflection.

As described above, the light deflection device disclosed in reference 1 deflects the incident light by inclining the plate member 104, which does not have a fixed end, has many advantages as described above, and is superior to other optical switches, such as a diffraction grating optical switch.

However, a plate member 104 without a fixed end suffers from the following problems.

FIG. 18A through FIG. 18C are a schematic plan view and schematic cross-sectional views illustrating components relevant to contacting the plate member 104 in the light deflection device disclosed in reference 1.

Specifically, FIG. 18A is a plan view illustrating the supporting member 1031, the plate member 104, and the electrodes 105a, 105b, 105c, and 105d of the light deflection device.

FIG. 18B is a cross-sectional view of a portion F along a GG' line in FIG. 18A.

FIG. 18C is a cross-sectional view of a portion F along an II' line in FIG. 18A.

In FIG. 18B and FIG. 18C, there is an insulating film 106 for preventing electrical short circuit between the plate member 104 and the electrodes 105a, 105b, 105c, and 105d. For example, the insulating film 106 is formed of a silicon oxide or a silicon nitride film. It should be noted that the insulating film 106 is omitted in FIG. 16A through FIG. 16D.

As shown in FIG. 18B and FIG. 18C, when the plate member 104 is inclined, the plate member 104 contacts the insulating film 106 at a line (line contact), which corresponds to an edge of the plate member 104. Due to this, a sticking force (indicated by open arrows in FIG. 18C) corresponding to the surface energy of the insulating film 106 in contact with the contacting part of the plate member 104 occurs. This sticking force impedes the inclination of the plate member 104, and when an electrostatic force is imposed additionally to cancel out this sticking force, the driving voltage ends up being increased.

In other words, in the light deflection device disclosed in reference 1, the plate member 104 contacts the substrate 101 (specifically, the insulating film 106 of the substrate 101) at a line (line contact), which corresponds to an edge of the plate member 104, and this causes an increased driving voltage. The sticking force can be ascribed to a water bridge force, a molecular force, or electrification. In addition, in reference 1, the contact line between the plate member 104 and the substrate 101 extends nearly the whole length of the plate member 104, and due to this, as described above, contact between the plate member 104 and the substrate 101 causes a relatively large sticking force, and this results in an increase of the driving voltage.

In order to prevent the increase of the driving voltage, for example, one can attempt to change the shape of the contacting part and reduce the size of the contacting part between the plate member 104 and the substrate 101. For example, the contacting part can be formed to have a projecting shape, and such a projecting shape can be fabricated by common semiconductor fabrication techniques, such as lithography and etching. In this case, a processing limit of a pattern, namely, the limiting dimension of a pattern under semiconductor processing, determines the minimum size of the projecting contacting part, and this processing limit is in turn determined by the lithography technique. The processing limit of the lithography technique depends on resolving power or resolution of a resist serving as a mask, whether unevenness exists in the device, and performance of a lithography apparatus, such as a stepper. Currently, the prevailing semiconductor processing technique is the sub-micron or half micron processing technique, and with this technique the processing limit of the projecting shape is about 0.5 to 1.0 μm in line width. This processing limit of processing the projecting contacting part shape depends on the lithography technique; hence, with existing techniques, the reduction of the size of the projecting contacting part is limited.

When using the light deflection device disclosed in reference 1 as an actuator, it is expected that the plate member, which is an operating part of the device, will be inclined while not being fixed. Here, a crucial technical problem is how to reduce the size of the contacting part to a level below the processing limit of the semiconductor processing technique.

Specifically, usually, a light deflection device is applied to an image projecting display device. In recent years, the image projecting display device has been widely applied to rear projection television sets or digital theaters, and it is required to further improve the contrast ratio of the image projecting display device. In this case, it is required to improve the ratio of reflected light in an ON condition and reflected light on an OFF condition. For example, in a DMD produced by Texas Instrument Co. or a mirror type optical switch like the light deflection device disclosed in reference 1, it is necessary to increase the light deflection angle. In other words, it is necessary to increase the inclined angle of the plate member (such as a mirror). Due to this, it is necessary to increase the distance between the plate member and the electrodes facing the plate member. Because the electrostatic attracting force is inversely proportional to the square of the distance between the electrodes, where the electrostatic attracting force occurs, it means the electrostatic attracting force acting on the plate member is reduced in order to improve the contrast ratio. When the sticking force induced in the contacting area of the projecting contacting part, which is fabricated at the processing limit, is predominant over the reduced electrostatic attracting force, the plate member is fixed but cannot be inclined. Thus, the driving voltage has to be increased to solve this problem.

SUMMARY OF THE INVENTION

The present invention may solve one or more problems of the related art.

A preferred embodiment of the present invention may provide an actuator including a contacting part having a size smaller than a processing limit of a lithography technique, and able to reduce a contacting area or a contacting length of the contacting part when an operating part is in operation, reduce a sticking force induced by contact, and decrease a driving voltage of the actuator, a method of producing the actuator, an optical system using the actuator, and an image forming device.

According to a first aspect of the present invention, there is provided an actuator, comprising:

an operating part; and a contacting part that is in contact with the operating part, said contacting part being formed by overlapping a first pattern on an end of a second pattern, said first pattern having a solid structure, a size of an upper portion of the solid structure of the first pattern on the second pattern being less than a processing resolving power or resolution.

As an embodiment, the contacting part is formed by overlapping two or more layers, and the contacting part corresponds to an overlapping portion of an end of a pattern of one of the two or more layers and an end of a pattern of another one of the two or more layers.

According to the embodiment of the present invention, since the actuator has a contacting part with a size less than a resolving power or resolution of a fabrication process or a fabrication device, it is possible to prevent the operation part from being fixed, and it is possible to drive the actuator at a low voltage.

As an embodiment, the actuator further comprises:

a substrate;

a plurality of regulation members that are arranged at corners of the substrate, respectively, each of said regulation members having a stopper at a top thereof;

a supporting member that has a top part, and is arranged on the surface of the substrate;

a plate member that acts as the operating part, and does not have a fixed end, said plate member including a light reflecting area, a conductive layer formed of a member having a conductive portion, said plate member being movably arranged in a space among the substrate, the supporting member, and the stoppers of the regulation members; and a plurality of electrodes that are arranged on the substrate, and are nearly opposite to the conductive layer of the plate member, wherein the plate member is inclined by an electrostatic attractive force with the supporting member as a center to deflect light incident onto the light reflecting area.

According to the embodiment of the present invention, the deflection angle of the mirror, that is, the plate member, can be controlled easily and stably, and the response speed is high; in addition, there is little long-term degradation, and it is possible to improve the ratio of the reflected light in an ON condition and the reflected light in an OFF condition, that is, an S/N ratio in a still image device, or a contrast ratio in a video device. Further, it is possible to reduce the size of the actuator and increase the degree of integration at low cost, and it is possible to perform one-axis two-dimensional light deflection and two-axis three-dimensional light deflection. Furthermore, it is possible to prevent the mirror from being fixed, and it is possible to drive the actuator at a low voltage.

As an embodiment, at least one of the two or more layers of the contacting part corresponds to a layer forming the electrodes.

According to the embodiment of the present invention, since one or more layers of the contacting part are also used as the layer for forming the electrodes, fabrication cost can be lowered.

As an embodiment, the supporting member is formed by overlapping two or more layers, and a contacting part of the supporting member corresponds to an overlapping portion of patterns of the two or more layers.

According to the embodiment of the present invention, since a small supporting part can be formed, the contacting area can be reduced greatly; thus the sticking force induced by contact can be reduced sufficiently, and a driving voltage of the actuator can be decreased.

As an embodiment, each of the patterns of the two or more layers is a rectangle, the contacting part of the supporting member corresponds to a portion where a long-side of one of the two or more layers intersects with a long-side of other one of the two or more layers.

According to the embodiment of the present invention, since the resolving power or resolution of a short-side of a rectangular pattern is higher than a square pattern, with rectangular patterns intersecting each other, it is possible to form a small contacting part of the supporting member; thus the contacting area can be reduced greatly, the sticking force induced by contact can be reduced sufficiently, and a driving voltage of the actuator can be decreased.

According to a second aspect of the present invention, there is provided a method of fabricating an actuator including a contacting part in contact with an operating part, comprising the step of:

forming the contacting part by overlapping a solid structure of a first pattern on an end of a second pattern with a size of an upper portion of the solid structure less than a processing resolving power or resolution.

As an embodiment, the contacting part is formed by overlapping two or more layers, and the contacting part corresponds to an overlapping portion of an end of a pattern of one of the two or more layers and an end of a pattern of another one of the two or more layers.

According to the embodiment of the present invention, since a small contacting part can be formed, a contacting area can be reduced greatly, thus, the sticking force induced by contact can be reduced sufficiently, and a driving voltage of the actuator can be decreased.

According to a third aspect of the present invention, there is provided an actuator array, comprising:

a plurality of actuators arranged in one dimension or two dimensions, wherein each of actuators includes:

an operating part; and a contacting part that is in contact with the operating part, said contacting part being formed by overlapping a first pattern on an end of a second pattern, said first pattern having a solid structure, a size of an upper portion of the solid structure of the first pattern on the second pattern being less than a processing resolving power or resolution.

According to the embodiment of the present invention, it is possible to prevent the operation part from being fixed, and it is possible to drive the actuator at a low voltage.

As an embodiment, the contacting part is formed by overlapping two or more layers, and the contacting part corresponds to an overlapping portion of an end of a pattern of one of the two or more layers and an end of a pattern of another one of the two or more layers.

As an embodiment, the actuator further comprises:

a substrate;

a plurality of regulation members that are arranged at corners of the substrate, respectively, each of said regulation members having a stopper at a top thereof;

a supporting member that has a top part, and is arranged on the surface of the substrate;

a plate member that acts as the operating part, and does not have a fixed end, said plate member including a light reflecting area, a conductive layer formed of a member having a conductive portion, said plate member being movably arranged in a space among the substrate, the supporting member, and the stoppers of the regulation members; and a plurality of electrodes that are arranged on the substrate, and are nearly opposite to the conductive layer of the plate member, wherein the plate member is inclined by an electrostatic attractive force with the supporting member as a center to deflect light incident onto the light reflecting area.

As an embodiment, at least one of the two or more layers of the contacting part corresponds to a layer forming the electrodes.

According to a fourth aspect of the present invention, there is provided an optical system, comprising:

an actuator array that includes a plurality of actuators arranged in one dimension or two dimensions;

a light source that emits light onto the actuator array; and a projecting lens that projects light reflected from the actuator array according to image data, wherein each of the actuators includes:

an operating part; and a contacting part that is in contact with the operating part, said contacting part being formed by overlapping a first pattern on an end of a second pattern, said first pattern having a solid structure, a size of an upper portion of the solid structure of the first pattern on the second pattern being less than a processing resolving power or resolution.

According to the embodiment of the present invention, since each actuator corresponding to one pixel can be driven at a low voltage, a small, highly-integrated, and low driving voltage memory circuit can be used as a semiconductor memory circuit in the actuator for storing image data, hence, it is possible to make the actuator array small and highly-integrated, and there realizing a small optical system.

According to a fifth aspect of the present invention, there is provided an image forming device, comprising:

a light writing unit that includes an optical system, said optical system including an actuator array having a plurality of actuators arranged in one dimension or two dimensions, a light source for emitting light onto the actuator array, and a projecting lens for projecting light reflected from the actuator array according to image data, wherein each of the actuators includes:

an operating part; and a contacting part that is in contact with the operating part, said contacting part being formed by overlapping a first pattern on an end of a second pattern, said first pattern having a solid structure, a size of an upper portion of the solid structure of the first pattern on the second pattern being less than a processing resolving power or resolution.

According to the embodiment of the present invention, since an inexpensive and high-definition light writing unit is used, it is possible to obtain an inexpensive and high-definition image forming device.

According to a sixth aspect of the present invention, there is provided an image projecting device, comprising:

a display unit that includes an optical system, said optical system including an actuator array having a plurality of actuators arranged in one dimension or two dimensions, a light source for emitting light onto the actuator array, and a projecting lens for projecting light reflected from the actuator array according to image data, wherein each of the actuators includes:

an operating part; and a contacting part that is in contact with the operating part, said contacting part being formed by overlapping a first pattern on an end of a second pattern, said first pattern having a solid structure, a size of an upper portion of the solid structure of the first pattern on the second pattern being less than a processing resolving power or resolution.

According to the embodiment of the present invention, since an inexpensive and high-definition display unit is used, it is possible to obtain an inexpensive and high-definition image projection device.

These and other objects, features, and advantages of the present invention will become more apparent from the following detailed description of preferred embodiments given with reference to the accompanying drawings.

BRIEF DESCRIPTION OF THE DRAWINGS

FIG. 7 is an enlarged cross-sectional view illustrating a portion of the light deflection device according to the second embodiment of the present invention;

FIG. 8A is a plan view illustrating an example of a one-dimensional light deflection device array according to a sixth embodiment;

FIG. 8B is a plan view illustrating an example of a two-dimensional light deflection device array according to a seventh embodiment;

FIG. 17 is a table illustrating a relationship between the combination of the voltages applied on the electrodes 105a, 105b, 105c, and 105d and the inclination direction of the plate member 104 in the light deflection device in FIG. 16A through FIG. 16D;

DESCRIPTION OF THE PREFERRED EMBODIMENTS

Below, preferred embodiments of the present invention are explained with reference to the accompanying drawings.

First Embodiment

In the first embodiment, an actuator is disclosed that includes an operating part, and a contacting part contacting the operating part. The contacting part is formed by overlapping two or more constituent layers, and the contacting part corresponds to an overlapping portion of an end of a pattern of one of the constituent layers and an end of a pattern of another one of the constituent layers. The contacting part is formed by overlapping a pattern having a solid structure on an end of another pattern. The upper portion of the solid structure of the pattern on the other pattern is smaller than a processing resolving power or resolution of a lithography technique.

Figure 1A:
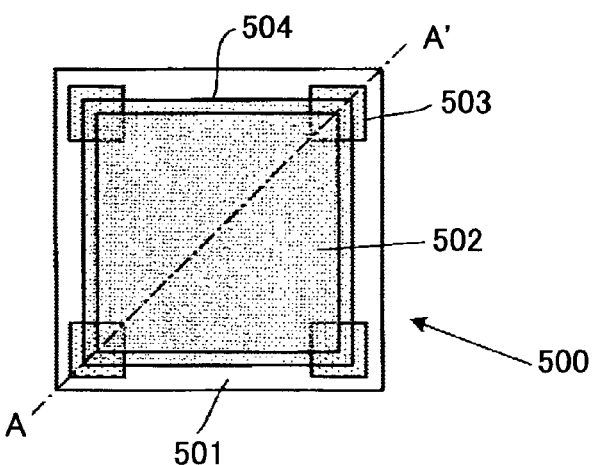
FIG. 1A through FIG. 1C are a plan view and cross-sectional views schematically illustrating a structure of an actuator 500 according to the present embodiment of the present invention.
Figure 1B:
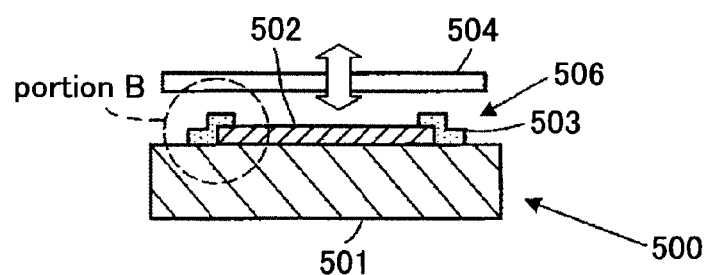
Figure 1C:
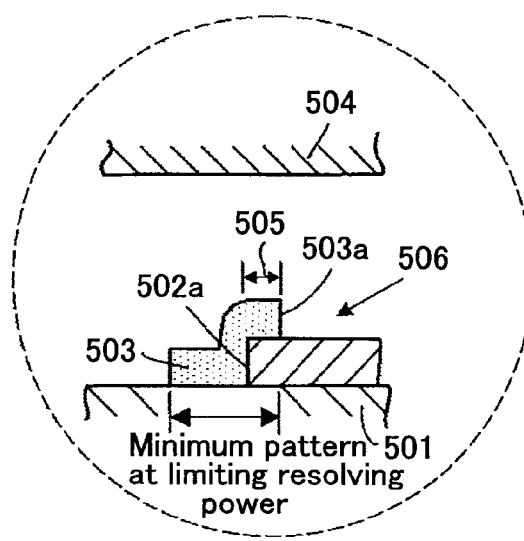

FIG. 1A through FIG. 1C are a plan view and cross-sectional views schematically illustrating a structure of an actuator 500 according to the present embodiment of the present invention.

Specifically, FIG. 1A is a plan view of the actuator 500, FIG. 1B is a cross-sectional view along an AA' line in FIG. 1A, and FIG. 1C is an enlarged cross-sectional view of a portion B in FIG. 1B.

Note that the actuator 500 in FIG. 1A through FIG. 1C is merely illustrated schematically, and the dimensional relationship of components of the actuator 500 illustrated in FIG. 1A through FIG. 1C is not the actual one. In addition, in FIG. 1A through FIG. 1C, only components relevant to the present invention are illustrated, and illustrations of other components are omitted.

As shown in FIG. 1A through FIG. 1C, the actuator 500 includes a substrate 501, constituent layers 502, 503, which are stacked together and form a contacting part 506 of the actuator 500, and a plate member 504, which serves as an operation part of the actuator 500.

As indicated by an open arrow in FIG. 1B, the plate member 504 of the actuator 500 is driven by a driving force to move up and down, and contacts the contacting part 506 formed on the substrate 501.

As shown in FIG. 1C, the contacting part 506 is formed by an overlapping part 505 of an end 502a of the constituent layer 502 and an end 503a of the constituent layer 503, that is, the overlapping part 505 has a solid structure. The constituent layer 502 and the constituent layer 503 can be patterned by semiconductor processing techniques, specifically, by stepper lithography and dry etching techniques, respectively. Here, the constituent layer 503 is patterned at a limiting resolving power or resolution of a semiconductor processing device, and at a limiting resolving power or resolution of a resist which is used as a mask for patterning.

For example, the constituent layer 503 is patterned to have a width of 0.8 μm by using a positive resist THMR produced by Tokyo Ohka Kogyo Co. LTD., and a g-line stepper. The overlapping part 505 has a width of 0.3 μm. Therefore, as shown in FIG. 1A, in the present embodiment, there are four contacting parts 506, and each of the contacting parts 506 has an area of 0.09 μm².

In the related art, since the contacting parts 506 are patterned at the processing limit of 0.8 μm, each of the contacting parts 506 has an area of 0.64 μm². That is, the contacting area of the present embodiment is reduced to 9/64 of that of the related art.

In the present embodiment, fluctuations of the sizes of the patterned contacting parts 506 are less than 0.1 μm in case of the dry etching technique, and fluctuations of overlapping are about 0.1 μm in case of the common stepper lithography technique. Due to this, even when the fluctuations are considered, the contacting area can be reduced greatly in the present embodiment.

In the present embodiment, when the contacting parts 506 are arranged at four corners of the actuator, the overlapping fluctuations cancel out when summing the contacting areas of the four contacting parts 506, and the influence of the overlapping fluctuations is small.

It is described above that the constituent layer 503 is patterned at the limiting resolving power or resolution, but it is clear from the gist of the present embodiment that patterning at the limiting resolving power or resolution it not required in the present embodiment. In this case, inexpensive exposure devices having relatively low resolving power or resolution can be used for stepper lithography, and the fabrication cost can be reduced.

Second Embodiment

In the second embodiment, in addition to the structure disclosed in the first embodiment, the actuator further includes a substrate; plural regulation members arranged at corners of the substrate, respectively, with each of the regulation members having a stopper at the top; a supporting member having a top part and arranged on the surface of the substrate; and a plate member acting as the operating part of the actuator, which does not have a fixed end. The plate member includes a light reflecting area and a conductive layer formed of a member having a conductive portion, and is movably arranged in a space among the substrate, the supporting member, and the stoppers of the regulation members. The actuator further includes plural electrodes arranged on the substrate to be nearly opposite to the conductive layer of the plate member. The plate member is inclined by an electrostatic attractive force with the supporting member as a center, and thus to deflect light incident onto the light reflecting area.

Further, in the actuator, at least one of the constituent layers of the contacting part also serves as a layer constituting the electrodes.

FIG. 2A through FIG. 2D are a plan view and cross-sectional views illustrating a structure of a light deflection device according to the second embodiment of the present invention.

Figure 2A:
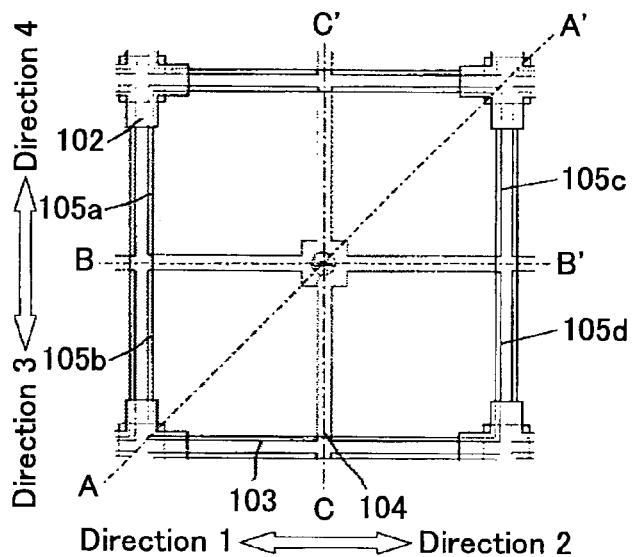
FIG. 2A through FIG. 2D are a plan view and cross-sectional views illustrating a structure of a light deflection device according to the second embodiment of the present invention.
Figure 2B:
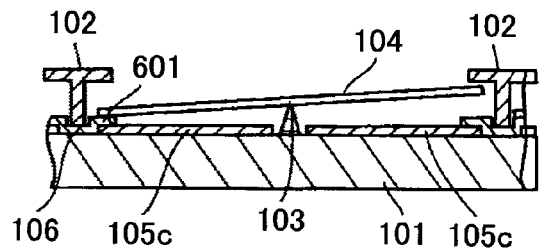
Figure 2C:
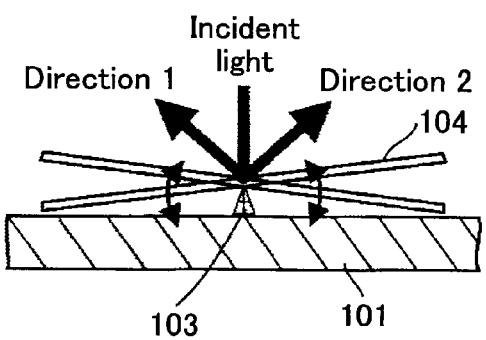
Figure 2D:
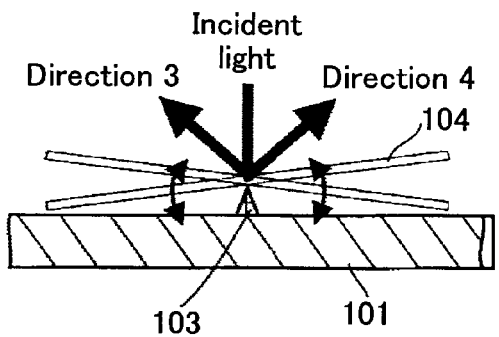

Specifically, FIG. 2A is a plan view of the light deflection device, FIG. 2B is a cross-sectional view along an AA' line in FIG. 2A, FIG. 2C is a cross-sectional view along a BB' line in FIG. 2A, and FIG. 2D is a cross-sectional view along a CC' line in FIG. 2A.

Note that the light deflection device shown in FIG. 2A through FIG. 2D corresponds to one actuator of a two dimensional light deflecting array including plural actuators.

Further, in the light deflection device shown in FIG. 2A through FIG. 2D, a contacting voltage is applied on the plate member (for example, a mirror), and the light deflection device is able to deflect the incident light along two axes in four directions.

In addition, in the present and the subsequent embodiments, the same reference numbers are assigned to the same component elements as described previously, and overlapping descriptions are omitted appropriately.

As shown in FIG. 2A through FIG. 2D, the light deflection device includes a substrate 101, plural regulation members 102, a supporting member 103, a plate member 104, and plural electrodes 105a, 105b, 105c, and 105d.

The regulation members 102 are arranged at corners of the substrate 101, respectively, and each of the regulation members 102 has a stopper at its top.

The supporting member 103, which is arranged on the surface of the substrate 101, has a top part formed of a conductive material.

The plate member 104 does not have a fixed end, namely, the plate member 104 is not fixed, and on the upper portion of the plate member 104, there are a light reflecting area and a conductive layer formed of a member with at least a conductive part. At the bottom of the plate member 104, at least a contacting part, which is in contact with the top of the supporting member 103, is formed of a conductive member. The plate member 104 is movably arranged in the space surrounded by the substrate 101, the supporting member 103, and the stoppers of the regulation members 102. A voltage on the plate member 104 is supplied through contact with the supporting member 103.

The electrodes 105a, 105b, 105c, and 105d are arranged on the substrate 101, and are substantially opposite to the conductive layer of the plate member 104.

In the present embodiment, a contacting part 601 is formed by overlapping an insulating film 106 on ends of patterns of the electrodes 105a, 105b, 105c, and 105d, and the contacting part 601 is smaller than the processing limit of the lithography technique, as described in the first embodiment.

In the light deflection device of the present embodiment, because of a combination of voltages applied on the electrodes 105a, 105b, 105c, 105d, and the supporting member 103, as shown in FIG. 2C and FIG. 2D, the plate member 104 is inclined in four directions. The four directions are indicated as "direction 1", "direction 2", "direction 3", and "direction 4" in FIG. 2C and FIG. 2D. Therefore, for example, when a light beam is incident in a direction perpendicular to the surface of the substrate 101, the plate member 104 reflects the incident light beam in the four directions. On the contrary, when at most four light beams are incident respectively in the four directions, the plate member 104 reflects the incident light beams in the direction perpendicular to the surface of the substrate 101.

According to the present embodiment, since the inclined angle of the plate member 104 is determined by contact between the substrate 101, the supporting member 103, and the plate member 104 (such as a mirror), it is easy to stably control the deflection angle of the mirror.

Since different voltages are applied on opposite electrodes with the supporting member 103 as a center, the thin plate member 104 can be rotated at high speed, and the response speed of the light deflection device is high. Further, since the plate member 104 does not have a fixed end, twisted deformation or other deformation does not occur in the plate member 104, and there is little long-term degradation of the plate member 104; hence the plate member 104 can be driven at a low voltage.

Since a tiny and lightweight plate member 104 can be fabricated by semiconductor processes, there is little shock caused by impact between the stopper of the regulation members 102 and the plate member 104; thus there is little long-term degradation of the plate member 104.

In addition, by appropriately determining the structure of the regulation members 102, the plate member 104, and the light reflecting area, it is possible to improve the ratio of the reflected light on an ON condition and the reflected light on an OFF condition, that is, an S/N ratio in a still image device, or a contrast ratio in a video device.

Since semiconductor processes and semiconductor process apparatuses can be used to fabricate the light deflection device, it is possible to reduce the size of the device and increase the degree of integration at low cost.

Further, since the electrodes 105a, 105b, 105c, and 105d are arranged with the supporting member 103 as a center, it is possible to perform one-axis two-dimensional light deflection and two-axis three-dimensional light deflection.

Furthermore, since the contacting part 601 is smaller than the processing limit of the lithography technique, even when the light deflection device of the present embodiment is made very small, it is possible to prevent the plate member (for example, a mirror) from being fixed, and it is possible to drive the actuator at a low voltage.

FIG. 6A through FIG. 6I are cross-sectional views exemplifying a method of producing the light deflection device (actuator) as shown in FIG. 2A through FIG. 2D which has the fine contacting part 601.

Specifically, FIG. 6A through FIG. 6I are cross-sectional views along an AA' line in FIG. 2A.

Figure 6A:
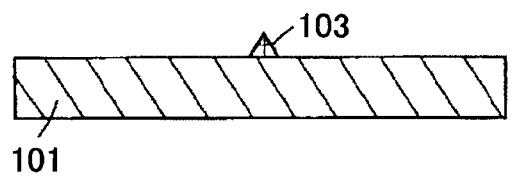
FIG. 6A through FIG. 6I are cross-sectional views exemplifying a method of producing the light deflection device (actuator) as shown in FIG. 2A through FIG. 2D which has the fine contacting part 601.

In the step shown in FIG. 6A, an aluminum-based alloy film for forming the supporting member 103 is deposited on the substrate 101 by magnetron sputtering, then a resist pattern is formed by stepper lithography and the supporting member 103 is then patterned by dry etching.

Here, for example, the substrate 101 is a silicon substrate, and a silicon oxide film (not illustrated) is formed to cover the entire surface of the substrate 101.

Figure 6B:
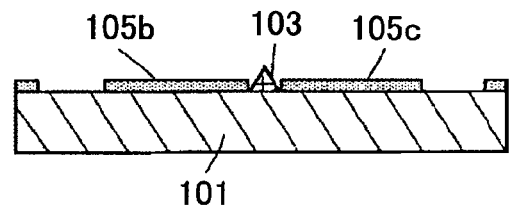

In the step shown in FIG. 6B, the electrodes 105a, 105b, 105c, and 105d are formed from a titanium nitride (TiN) thin film. Specifically, the TiN thin film is formed by reactive sputtering by using a titanium target, and the electrodes 105a, 105b, 105c, and 105d are patterned by stepper lithography and dry etching. These electrodes 105a, 105b, 105c, and 105d also serve as one of the layers constituting the fine contacting part 601 of the present embodiment.

Figure 6C:
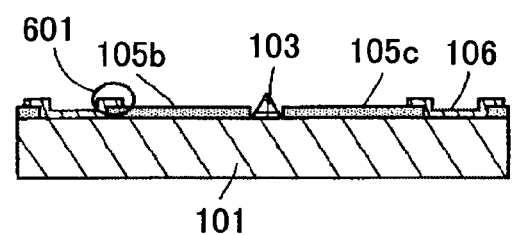

In the step shown in FIG. 6C, a silicon oxide film is formed by plasma CVD, which serves as the insulating film 106, that is, as one constituent layer of the fine contacting part 601 of the present embodiment. Then, the insulating film 106 is patterned by stepper lithography and dry etching.

In this step, the end of the pattern of the insulating film 106 is superposed on the ends of the patterns of the electrodes 105a, 105b, 105c, and 105d, and the resulting overlapping part constitutes the fine contacting part 601 of the present embodiment.

Figure 6D:
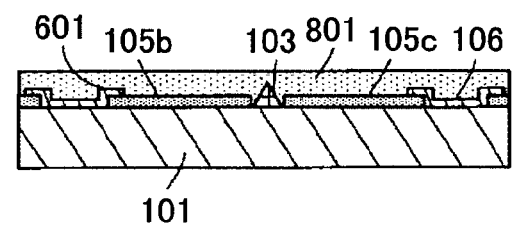

In the step shown in FIG. 6D, a flat organic film of heat-resistance is formed by spin-coating, and after that, the organic film is hardened by heat treatment. This organic film is referred to as a first sacrifice film 801. It should be noted that a poly-crystal silicon film may be used as the first sacrifice film 801 instead of the above organic film.

Figure 6E:
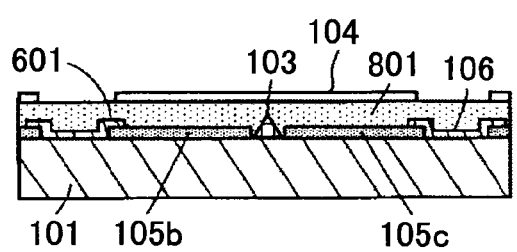

In the step shown in FIG. 6E, an aluminum-based alloy film used for the plate member 104 is deposited by DC magnetron sputtering and is then patterned. The plate member 104 is formed from a stacked structure of a layer of high light-reflectivity and a layer of high elasticity and rigidity, and also has functions of a conductive layer.

Figure 6F:
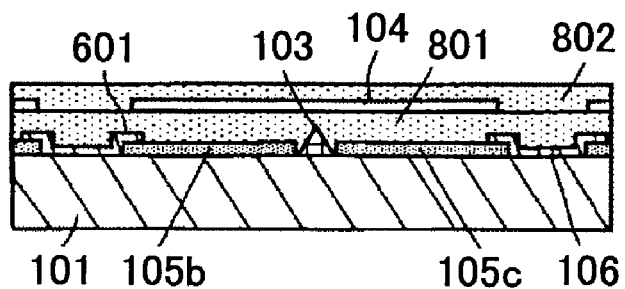

In the step shown in FIG. 6F, another flat organic film of heat-resistance is formed by spin-coating again, and after that, the organic film is hardened by heat treatment. This organic film is referred to as a second sacrifice film 802. It should be noted that a poly-crystal silicon film may be used as the second sacrifice film 802 instead of the organic film.

Figure 6G:
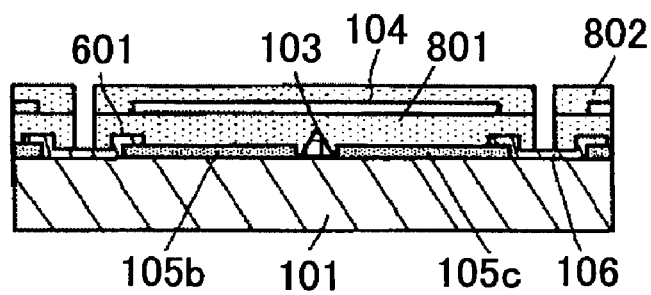

In the step shown in FIG. 6G, the substrate including the structure formed so far is divided into plural separate light deflection devices. In order to form the stoppers of the regulation members 102, openings serving as slits or holes are formed and are patterned in the first sacrifice film 801 and the second sacrifice film 802 simultaneously by stepper lithography and dry etching.

Figure 6H:
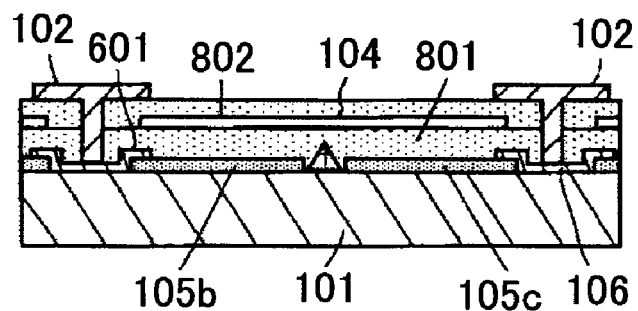

In the step shown in FIG. 6H, a silicon oxide film is formed by plasma CVD, which serves as the regulation members 102 having stoppers. Then, the silicon oxide film is patterned by stepper lithography and dry etching. It should be noted that the regulation members 102 having stoppers may be arranged not only as shown in FIG. 6H, but also be arranged at any positions as long as the regulation members 102 are able to confine the plate member 104 into a specified space.

Figure 6I:
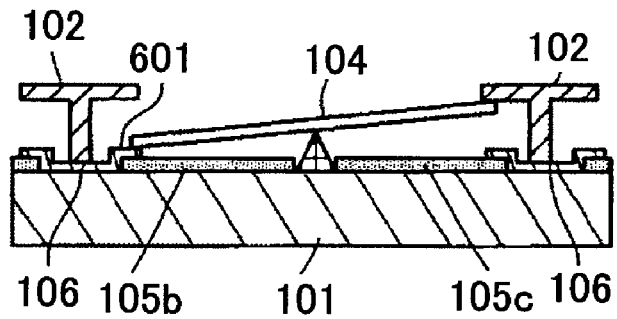

In the step shown in FIG. 6I, the residual first sacrifice film 801 and the residual second sacrifice film 802 are removed by plasma etching through the openings, and thereby, the plate member 104 is located in a space which limits the movable range of the plate member 104. In this way, the light deflection device (actuator) as shown in FIG. 2A through FIG. 2D is fabricated.

When etching the sacrifice films, depending on types of the sacrifice films, not only dry etching but also wet etching can be used. In addition, since etching of the sacrifice films proceeds in the surface direction of the substrate, the plate member 104 is exposed in the etching environment when etching the sacrifice films. For this reason, it is important that appropriate materials resistant against etching be selected for the plate member 104.

It should be noted that in the method illustrated in FIG. 6A through FIG. 6I, a voltage supplying line for supplying a voltage to the electrodes 105a, 105b, 105c, and 105d, and the supporting member 103 is omitted.

FIG. 7 is an enlarged cross-sectional view illustrating a portion of the light deflection device according to the second embodiment of the present invention.

Specifically, FIG. 7 is a cross-sectional view along an AA' line in FIG. 2A, and shows a semiconductor memory circuit, a voltage supplying line, and a portion of the actuator of the present embodiment.

As shown in FIG. 7, a semiconductor memory circuit and a voltage supplying line are provided below the actuator, and the semiconductor memory circuit and the voltage supplying line supply appropriate voltages to the electrodes 105a, 105b, 105c, and 105d, and the supporting member 103.

Third Embodiment

Figure 3A:
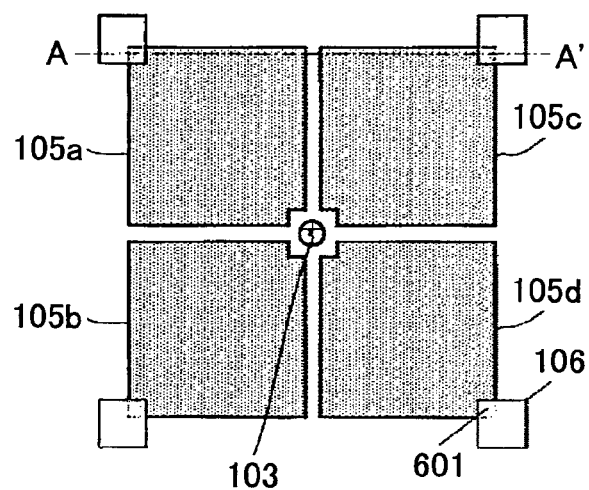
FIG. 3A and FIG. 3B are a plan view and a cross-sectional view schematically illustrating a principal portion of a light deflection device according to a third embodiment of the present invention.
Figure 3B:
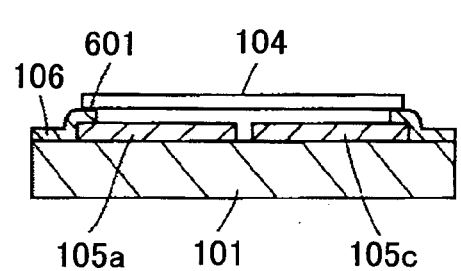

FIG. 3A and FIG. 3B are a plan view and a cross-sectional view schematically illustrating a principal portion of a light deflection device according to a third embodiment of the present invention.

Specifically, FIG. 3A is a plan view of the principal portion of the light deflection device according to the present embodiment, and FIG. 3B is a cross-sectional view along an AA' line in FIG. 3A.

In FIG. 3A and FIG. 3B, only those components relevant to contact between the plate member 104 and the insulating film 106 are illustrated in order to clarify features of the present embodiment. Specifically, FIG. 3A illustrates the supporting member 103, the electrodes 105a, 105b, 105c, and 105d, and the insulating film 106. In addition, a contacting part 601 is illustrated which corresponds to an overlapping part of the end of the pattern of the insulating film 106 and the ends of the patterns of the electrodes 105a, 105b, 105c, and 105d.

In FIG. 3B, in addition to the supporting member 103, the electrodes 105a, 105b, 105c, and 105d, and the insulating film 106, it is illustrated that a plate member 104 (for example, a mirror) is inclined to contact the contacting part 601.

In a light deflection device including the contacting part 601 shown in FIG. 3A and FIG. 3B, corners of the electrodes 105a, 105b, 105c, and 105d are processed, therefore, even though the area of the electrodes opposite to the plate member 104 decreases slightly, a contacting length of the contacting part 601 is reduced compared to the second embodiment, and it is possible to further prevent the plate member 104 from being fixed.

Fourth Embodiment

Figure 4A:
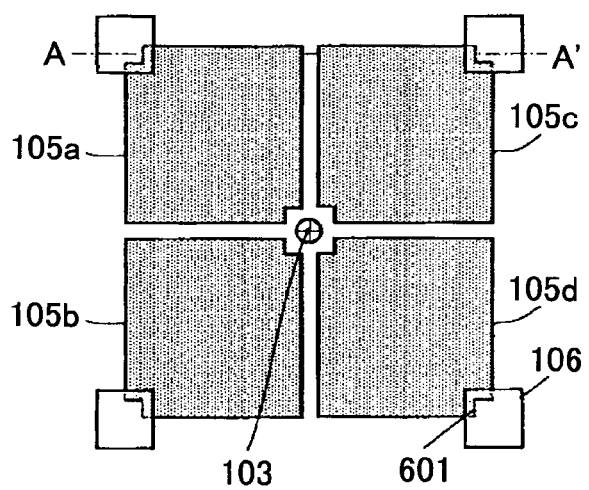
FIG. 4A and FIG. 4B are a plan view and a cross-sectional view schematically illustrating a principal portion of a light deflection device according to a fourth embodiment of the present invention.
Figure 4B:
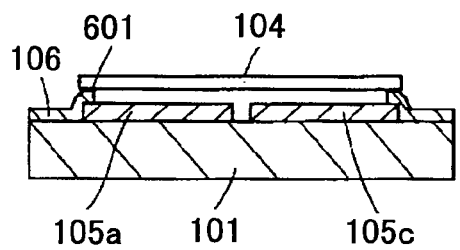

FIG. 4A and FIG. 4B are a plan view and a cross-sectional view schematically illustrating a principal portion of a light deflection device according to a fourth embodiment of the present invention.

Specifically, FIG. 4A is a plan view of the principal portion of the light deflection device according to the present embodiment, and FIG. 4B is a cross-sectional view along an AA' line in FIG. 4A.

In FIG. 4A and FIG. 4B, only those components relevant to contact between the plate member 104 and the insulating film 106 are illustrated. Specifically, FIG. 4A illustrates the supporting member 103, the electrodes 105a, 105b, 105c, and 105d, and the insulating film 106. In addition, a contacting part 601 is illustrated which corresponds to an overlapping portion of the end of the pattern of the insulating film 106 and the ends of the patterns of the electrodes 105a, 105b, 105c, and 105d.

In FIG. 4B, in addition to the supporting member 103, the electrodes 105a, 105b, 105c, and 105d, and the insulating film 106, it is illustrated that a plate member 104 (for example, a mirror) is inclined to contact the contacting part 601.

In a light deflection device including the contacting part 601 as shown in FIG. 4A and FIG. 4B, corners of the electrodes 105a, 105b, 105c, and 105d are processed as shown in FIG. 4A, and the insulating film 106 is processed as shown in FIG. 4B; therefore, the insulating film 106 exists on a better part of the upper surface of the electrodes 105a, 105b, 105c, and 105d.

Due to such a structure, similar to the third embodiment, a contacting length of the contacting part 601 is reduced compared to the second embodiment, and fixing of the plate member 104 is preventable. Furthermore, since the insulating film 106 exists on a greater part of the upper surface of the electrodes 105a, 105b, 105c, and 105d, compared to the case of an air gap, that is, the insulating film 106 is not formed on the electrodes 105a, 105b, 105c, and 105d, the electrostatic capacitance between the plate member 104 and the electrodes 105a, 105b, 105c, and 105d increases, and the electrostatic attracting force can be increased. These further prevent the plate member 104 from being fixed.

Fifth Embodiment

Figure 5A:
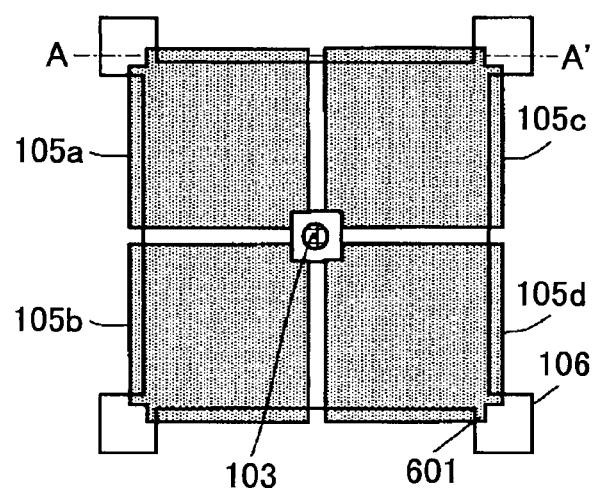
FIG. 5A and FIG. 5B are a plan view and a cross-sectional view schematically illustrating a principal portion of a light deflection device according to a fifth embodiment of the present invention.
Figure 5B:
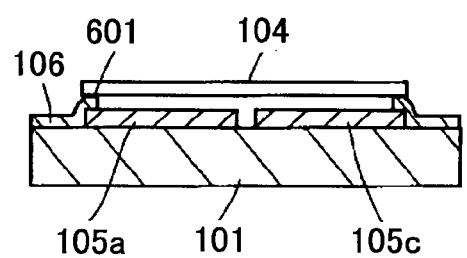

FIG. 5A and FIG. 5B are a plan view and a cross-sectional view schematically illustrating a principal portion of a light deflection device according to a fifth embodiment of the present invention.

Specifically, FIG. 5A is a plan view of the principal portion of the light deflection device, and FIG. 5B is a cross-sectional view along an AA' line in FIG. 5A.

Similar to FIG. 3A, FIG. 3B, FIG. 4A, and FIG. 4B, in FIG. 5A and FIG. 5B, only components relevant to contact between the plate member 104 and the insulating film 106 are illustrated; specifically, FIG. 5A illustrates the supporting member 103, the electrodes 105a, 105b, 105c, and 105d, and the insulating film 106. In addition, a contacting part 601 is illustrated which corresponds to an overlapping part of the end of the pattern of the insulating film 106 and the ends of the patterns of the electrodes 105a, 105b, 105c, and 105d.

In FIG. 5B, in addition to the supporting member 103, the electrodes 105a, 105b, 105c, and 105d, and the insulating film 106, it is illustrated that a plate member 104 (for example, a mirror) is inclined to contact the contacting part 601.

In a light deflection device including the contacting part 601 shown in FIG. 5A and FIG. 5B, corners of the electrodes 105a, 105b, 105c, and 105d are processed; therefore, even though the area of the electrodes opposite to the plate member 104 decreases slightly, a contacting length of the contacting part 601 is reduced compared to the second embodiment, and it is possible to further prevent the plate member 104 from being fixed.

Sixth Embodiment

In the sixth embodiment, a number of the actuators described above are arranged in one dimension to constitute a light deflection device array.

FIG. 8A is a plan view illustrating an example of a one-dimensional light deflection device array according to the sixth embodiment.

For example, the one-dimensional light deflection device array in FIG. 8A is formed of plural light deflection devices as described in FIG. 2A through FIG. 2D. Specifically, a number of the light deflection devices shown in FIG. 2A through FIG. 2D are arranged in a line in a direction perpendicular to light deflection directions. Here, such a light deflection device array is referred to as "one-axis two-dimension light deflection array", that is, the light deflection devices are arranged along one axis, and the light deflection array deflects incident light in two dimensions.

By arranging plural light deflection devices to be a one-dimensional light deflection device array, it is possible to prevent the plate member 104 from being fixed, and it is possible to drive the light deflection device array at a low voltage.

Seventh Embodiment

In the sixth embodiment, a number of the actuators described above are arranged in two dimensions to constitute a light deflection device array.

FIG. 8B is a plan view illustrating an example of a two-dimensional light deflection device array according to the seventh embodiment.

For example, the two-dimensional light deflection device array in FIG. 8B is formed of plural light deflection devices as described in FIG. 2A through FIG. 2D. Specifically, a number of the light deflection devices shown in FIG. 2A through FIG. 2D are arranged in two dimensions, in other words, the light deflection devices are arranged along two axes, and the light deflection array deflects incident light in three dimensions. Here, such a light deflection device array is referred to as "two-axis three-dimension light deflection array".

By arranging plural light deflection devices to be a two-dimensional light deflection device array, it is possible to prevent the plate member 104 from being fixed, and it is possible to drive the light deflection device array at a low voltage.

Eighth Embodiment

Figure 9:
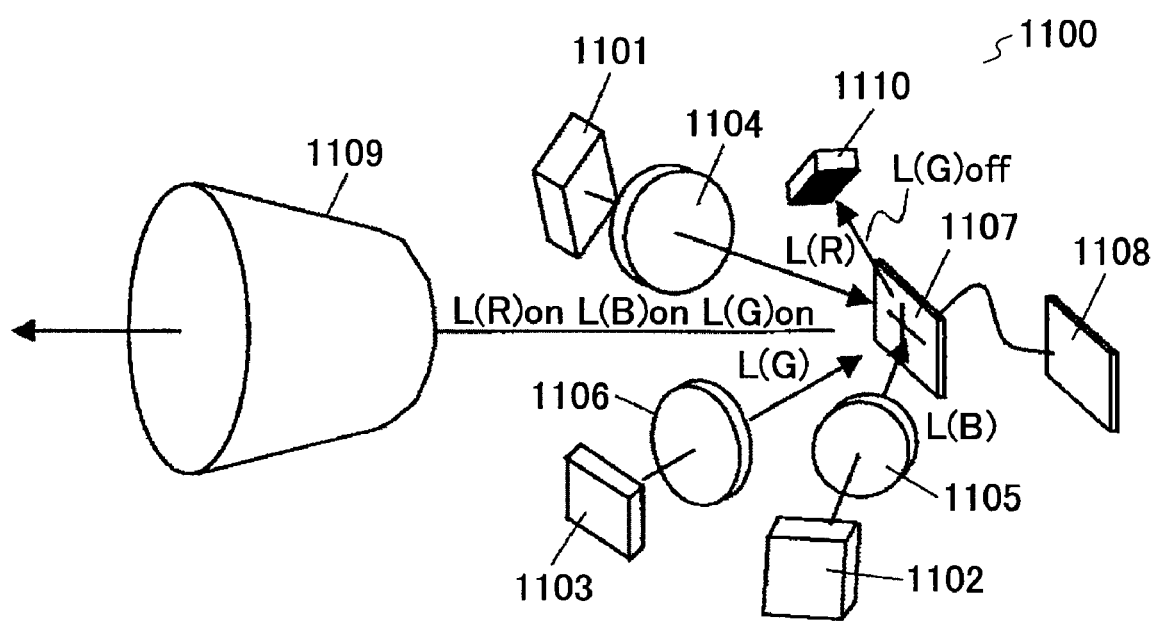
FIG. 9 is a perspective view illustrating an optical system 1100 according to an eighth embodiment which includes the light deflection device array as described in previous embodiments.

FIG. 9 is a perspective view illustrating an optical system 1100 according to an eighth embodiment which includes the light deflection device array as described in previous embodiments.

The optical system 1100 as shown in FIG. 9 has the two-dimensional light deflection device array (two-dimensional actuator array) as shown in FIG. 8B. In addition, the optical system 1100 in FIG. 9 includes light sources which emit light onto the two-dimensional actuator array 1107, and a projecting lens 1109 which projects light reflected from the actuator array 1107 according to input image data.

Specifically, as shown in FIG. 9, the optical system 1100 includes a red light source 1101, a blue light source 1102, and a green light source 1103, shaping lenses 1104, 1105, and 1106 for shaping light from the light source, the actuator array 1107, a control chip or a controller board 1108 for controlling light deflection directions of individual light deflectors of the actuator array 1107, the projecting lens 1109, and a light absorbing plate 1110.

The red light source 1101, the blue light source 1102, and the green light source 1103 emit light of the three primary colors, that is, red light L(R), blue light L(B), and green light L(G), and the light of the three primary colors L(R), L(B), and L(G) is directed onto the two-dimensional actuator array 1107. The optical system 1100 is configured such that the light of the three primary colors L(R), L(B), L(G) from the red light source 1101, the blue light source 1102, and the green light source 1103, respectively are directed onto the two-dimensional actuator array 1107.

As described with reference to FIG. 8B, the actuator array 1107 is able to deflect incident light along two axes in four directions. The light of the three primary colors L(R), L(B), L(G) from the red light source 1101, the blue light source 1102, and the green light source 1103, respectively, are reflected by the actuator array 1107 in a normal direction of the array surface (that is, the direction perpendicular to the array surface) according to input image data. The reflected light is directed to the projecting lens 1109 for projection.

As for timings of switching the light deflection directions for display of different colors, for example, reference can be made to Japanese Laid-Open Patent Application No. 2004-138881 (hereinafter referred to as "reference 2").

For example, the red light source 1101, the blue light source 1102, or the green light source 1103 may be a LD light source, or a LED light source, or an array light source.

The light of the three primary colors L(R), L(B), L(G) passes through the shaping lenses 1104, 1105, and 1106, respectively to improve luminance and directionality of the light sources 1101, 1102, and 1103. For example, if an aperture is provided, a rectangular shape light beam can be obtained. The shaped red light L(R), blue light L(B), and green light L(G) are incident on the actuator array 1107 in three different directions, respectively.

In the actuator array 1107, which is able to deflect incident light along two axes in four directions, the four deflection directions of each light deflector of the actuator array 1107 is assigned for displaying red color, green color, and blue color, and black color (OFF condition). In response to input image data, namely, information of red color, green color, and blue color, the red light L(R), the blue light L(B), and the green light L(G) are reflected by the actuator array 1107 in the normal direction of the array surface (that is, the direction perpendicular to the array surface), and the reflected light is directed to the projecting lens 1109 for projection. In the OFF condition, that is, black color, the light of the three primary colors are not reflected in the direction perpendicular to the array surface, and part of the incident light, for example, the green light L(G) is reflected in a direction different from the desired direction, and is absorbed by the light absorbing plate 1110. For example, the light absorbing plate 1110 can be arranged for each of the red light L(R), the blue light L(B), and the green light L(G).

In order for color displaying of each pixel, the assignment of the four deflection directions should be determined for each light deflector of the actuator array 1107. This can be performed by a control chip or a controller board 1108, which is connected to the actuator array 1107.

According to the present embodiment, the optical system 1100 of the present embodiment does not need a color wheel, and image projection can be performed by one actuator array; hence, the optical system 1100 is simple and can be made small. Since LDs, LEDs, or a light source array is used as the light source, heat generation is low, the size of the device is small, and power consumption is low; further, cooling fans for cooling the device are not needed.

In addition, since the two-dimensional light deflection device array (two-dimensional actuator array) as shown in FIG. 8B is used as the actuator array 1107, it is possible to drive the actuators corresponding to respective pixels at a low voltage. Due to this, a semiconductor memory circuit requiring a driving voltage as low as 3.3 volts can be used for the semiconductor memory circuit, which is provided in the actuator for storing image data.

As described previously, the semiconductor memory circuit is provided below the actuator. When the actuator becomes small, the area occupied by the semiconductor memory circuit becomes a problem. In other words, if only the actuator becomes small, and the semiconductor memory circuit remains large, the actuator array cannot become small.

In the present embodiment, since a low-voltage semiconductor memory circuit can be used, the area occupied by the semiconductor memory circuit becomes small, too. Specifically, using a SRAM as an example, which is a common semiconductor memory circuit, one set of SRAMs each driven by 5 V occupies an area of about 100 µm², but one set of SRAMs each driven by 3.3 V only occupies an area of about 25 µm². Therefore, since a low-voltage semiconductor memory circuit can be used, it is possible to reduce the size of the actuator array and increase the degree of integration; since an actuator array of high degree of integration can be used, it is possible to obtain an inexpensive and high-definition image projection device.

Ninth Embodiment

Figure 10:
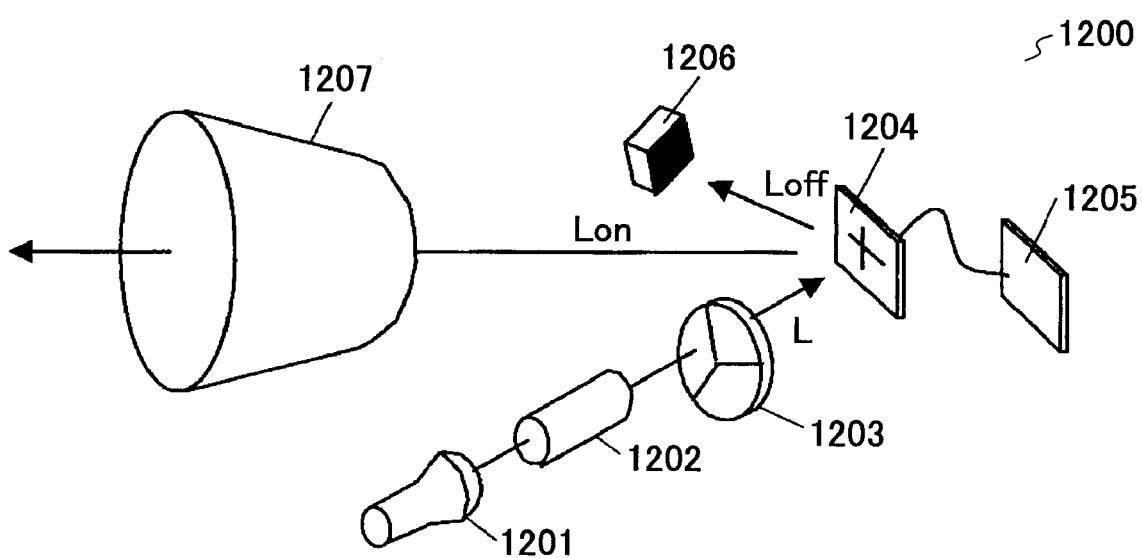
FIG. 10 is a perspective view illustrating an optical system 1200 according to a ninth embodiment.

FIG. 10 is a perspective view illustrating an optical system 1200 according to a ninth embodiment.

The optical system 1200 as shown in FIG. 10 includes a color wheel 1203 for displaying three primary colors in a time-division manner. For example, reference 1 discloses an image projection device for displaying three primary colors in a time-division manner.

As shown in FIG. 10, the optical system 1200 includes a white color light source 1201, such as a halogen lamp, or a xenon lamp, a rod lens 1202 for shaping light from the light source, the color wheel 1203 including color filters corresponding to the three primary colors, an actuator array 1204, a control chip 1205 for controlling light deflection directions of individual light deflectors of the actuator array 1204, a projecting lens 1207, and a light absorbing plate 1206.

In this embodiment, the optical system 1200 has the one-dimensional light deflection device array (one-dimensional actuator array) as shown in FIG. 8A but not the two-dimensional light deflection device array (two-dimensional actuator array) as shown in FIG. 8B. That is, the actuator array 1204 in the present embodiment can deflect incident light along one axis in two directions, but cannot deflect incident light along two axes in four directions. Specifically, the actuator array 1204 deflects incident light from one direction in an object direction (referred to as an "ON direction") and another direction (referred to as an "OFF direction") according to input image data.

The white light from the light source 1201 passes through the rod lens 1202 for shaping, and the shaped light is incident on the color wheel 1203. Passing through the color wheel 1203, the outgoing light presents red color, green color, and blue color sequentially in a time-division manner. This light beam is represented by "L" in FIG. 10. The light beam L is irradiated onto the actuator array 1204.

Each light deflector of the actuator array 1204 performs light deflection according to the input image data, namely, the color information, and each light deflector reflects the incident light Lon in the object direction, such as a normal direction of the array surface (that is, the direction perpendicular to the array surface), and the reflected light is directed to the projecting lens 1207 for projection. The color information projected sequentially in a time division manner is combined in the eyes of a viewer by an afterimage phenomenon, thereby, forming a full color image. The light reflected in the OFF direction is absorbed by the light absorbing plate 1206.

Since the one-dimensional light deflection device array (one-dimensional actuator array) as shown in FIG. 8A is used as the actuator array 1204, it is possible to drive the actuators corresponding respective pixels at a low voltage. Due to this, a low-voltage semiconductor memory circuit can be used as the semiconductor memory circuit, thus, reducing the area occupied by the semiconductor memory circuit. Therefore, it is possible to reduce the size of the actuator array and increase the degree of integration, and it is possible to obtain an inexpensive and high-definition image projection device.

10th Embodiment

Figure 11:
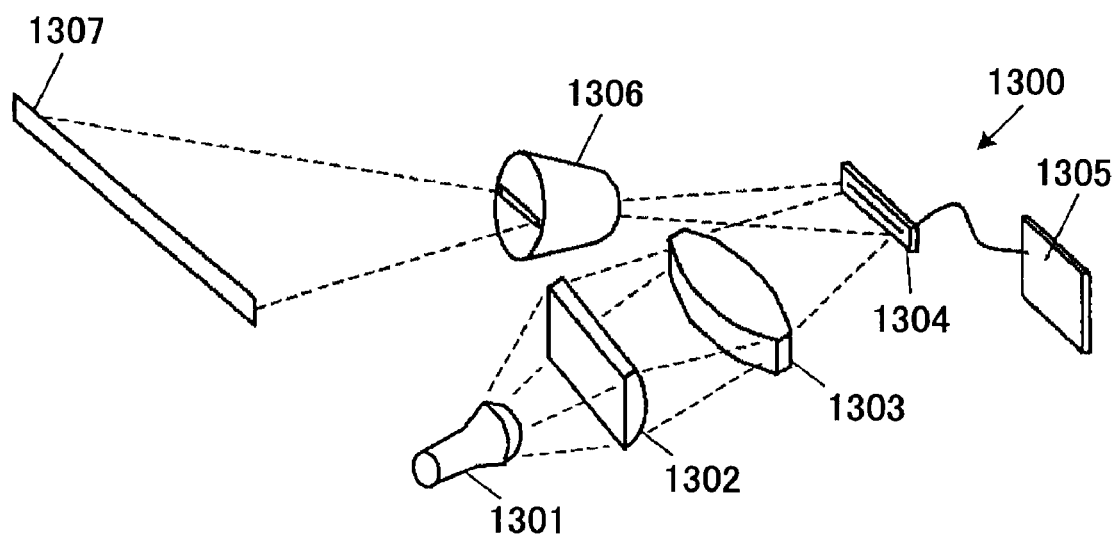
FIG. 11 is a perspective view illustrating an optical system 1300 according to a 10th embodiment of the present invention.

FIG. 11 is a perspective view illustrating an optical system 1300 according to a 10th embodiment of the present invention.

The optical system 1300 is primarily used in an image forming device.

As shown in FIG. 11, the optical system 1300 includes a light source 1301, optical lenses 1302, 1303, an actuator array 1304, a control chip 1305, a projecting lens 1306, and a projection plane 1307.

For example, the light source 1301 is a white color light source like a halogen lamp, a xenon lamp, a metal halide lamp, or an ultrahigh pressure mercury lamp; or, the light source 1301 is a monochromatic light source, like a semiconductor laser, a LED, or an array of the semiconductor lasers or LEDs.

Light from the light source 1301 passes through the optical lens 1302, and is shaped along a direction perpendicular to the line of the actuator array 1304, thus becomes a line-shaped light source. Then, line-shaped light from the line-shaped light source passes through the optical lens 1303, and is shaped along the line of the actuator array 1304. The light passing through the two optical lenses 1302, 1303 is irradiated onto the actuator array 1304 in arbitrary directions. The light deflectors of the actuator array 1304 each are driven by signals from the control chip 1305, which are generated based on input image data. The light deflectors each reflect the incident light in an object direction (light in the object direction is referred to as "ON light"), and the ON light is directed to the projecting lens 1306 for projection.

Here, the actuator array 1304 is the one-dimensional light deflection device array (one-dimensional actuator array) as shown in FIG. 8A, that is, the actuator array 1304 is able to deflect incident light along one axis in two directions.

Light directed to the projecting lens 1306 is enlarged and projected onto the projection plane 1307 to a desired size.

It should be noted that in the optical system 1300, it is described above that the reflected light is condensed to form an image near the incidence side of the projecting lens 1306, but the present embodiment is not limited to this. For example, the optical system of the present embodiment may form an image on the surface of the light deflection array.

Since the one-dimensional light deflection device array (one-dimensional actuator array) as shown in FIG. 8A is used as the actuator array 1304, it is possible to drive the actuators' corresponding pixels at a low voltage. Due to this, a low-voltage semiconductor memory circuit can be used as the semiconductor memory circuit; thus the area occupied by the semiconductor memory circuit can be reduced. Therefore, it is possible to reduce the size of the actuator array and increase the degree of integration, and it is possible to obtain an inexpensive and high-definition image projection device.

11th Embodiment

Figure 12:
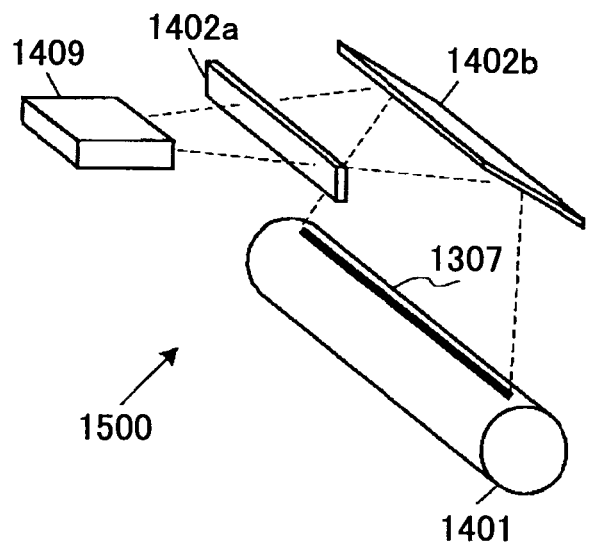
FIG. 12 is a perspective view schematically illustrating an image forming device according to an 11th embodiment of the present invention which includes a light writing unit 1500.

FIG. 12 is a perspective view schematically illustrating an image forming device including a light writing unit 1500 according to an 11th embodiment of the present invention.

As shown in FIG. 12, the light writing unit 1500 includes an optical system 1409 as shown in FIG. 11, which projects reflected light according to input image data. The projected light passes through an optical lens 1402a, is reflected by a total reflection mirror 1402b, and then is projected onto the line-shapes projection plane 1307 on a photoconductive drum 1401, which acts as an image carrier.

12th Embodiment

Figure 13:
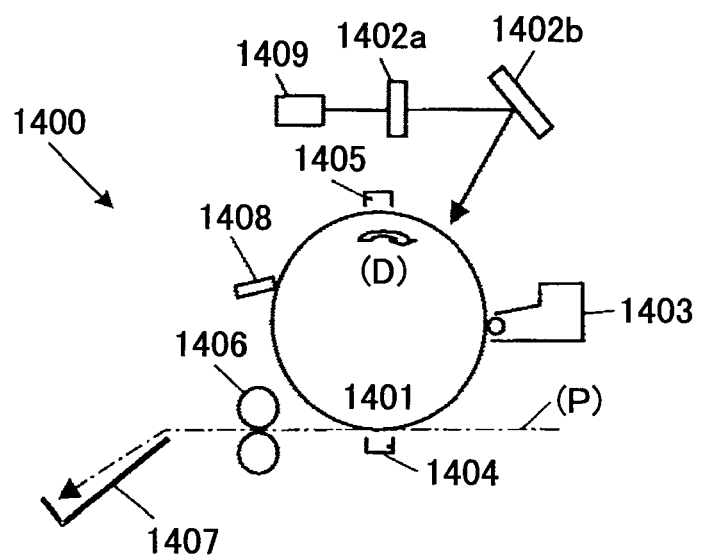
FIG. 13 is a schematic view illustrating a configuration of an image forming device 1400 according to a 12th embodiment of the present invention.

FIG. 13 is a schematic view illustrating a configuration of an image forming device 1400 according to a 12th embodiment of the present invention.

Here, the light writing unit 1500 as shown in FIG. 12 is used in the image forming device 1400 of the present embodiment.

The image forming device 1400 is an electrophotographic image forming device, which performs light writing in an electrophotographic manner to form images. As shown in FIG. 13, the image forming device 1400 includes a photoconductive drum 1401, a charging unit 1405, light writing units 1409, 1402a, 1402b, a developing unit 1403, a transfer unit 1404, a fusing unit 1406, a delivery tray 1407, and a cleaning unit 1408.

The photoconductive drum 1401 is installed rotably along a direction D, and acts as a carrier of images. The charging unit 1405 is a well known charging unit, which uniformly charges the photoconductive drum 1401.

The light writing units 1409, 1402a, 1402b direct incident light beams onto the surface of the photoconductive drum 1401 to form a latent image on the surface of the photoconductive drum 1401.

The developing unit 1403 develops the latent image to convert the latent image to a toner image.

Then, the transfer unit 1404 transfers the toner image onto a sheet material P, and the toner image transferred on the sheet material P is fused on the sheet material P by the fusing unit 1406.

Next, the sheet material P with the fused toner image is delivered to the delivery tray 1407, and is accommodated in the delivery tray 1407.

On the other hand, after the toner image is transferred onto the sheet material P by the transfer unit 1404, the photoconductive drum 1401 is cleaned by the cleaning unit 1408 and is ready to be used in the next step.

Here, the light writing unit 1500 as shown in FIG. 12 is used as the light writing units 1409, 1402a, 1402b in the image forming device 1400 of the present embodiment.

Since the light writing units 1409, 1402a, 1402b include actuators each having a small contacting part, the light writing units are inexpensive and have high definition; hence it is possible to obtain an inexpensive and high-definition image forming device.

13th Embodiment

Figure 14:
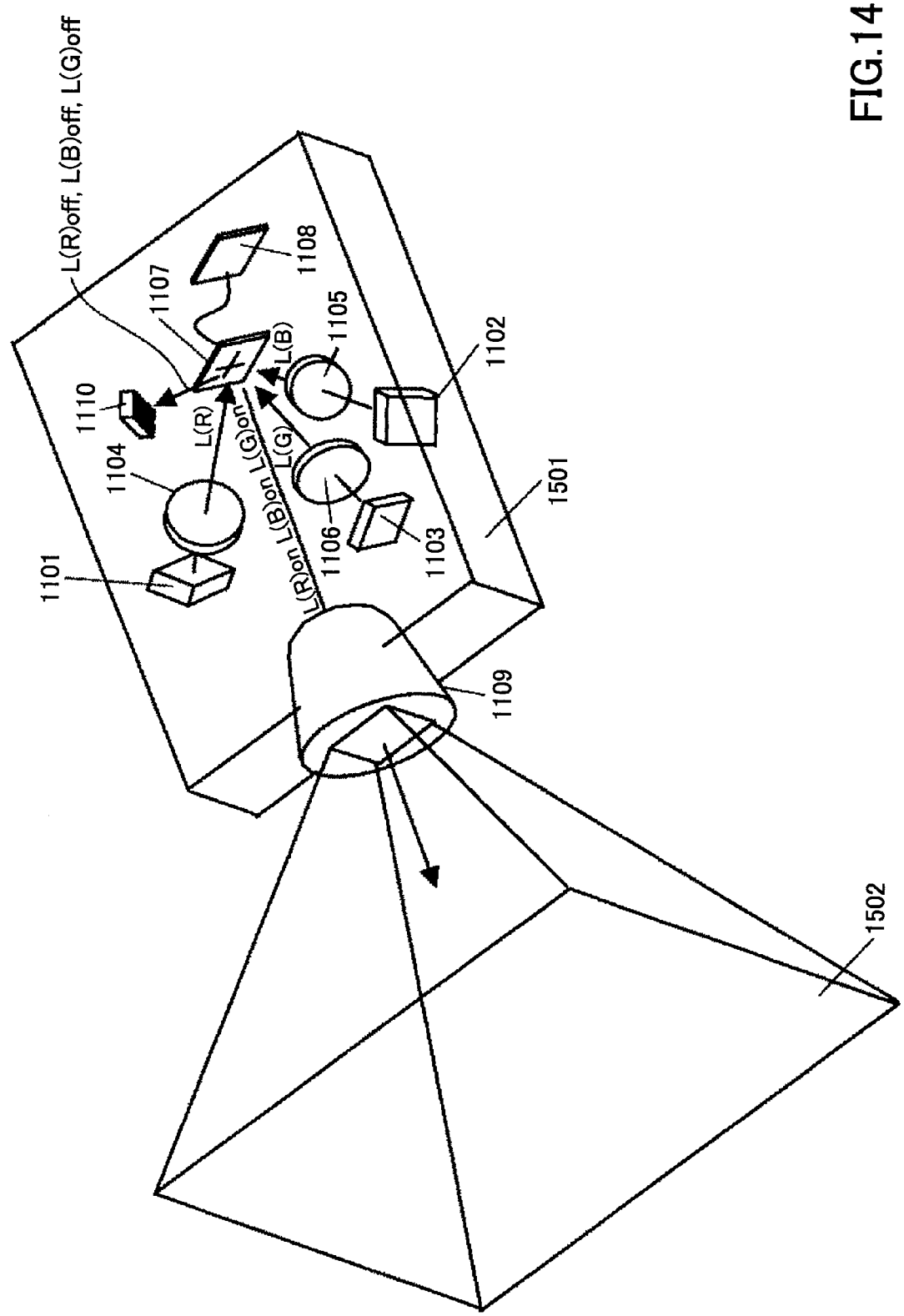
FIG. 14 is a schematic view illustrating a configuration of an image projecting device 1501 according to a 13th embodiment of the present invention.

FIG. 14 is a schematic view illustrating a configuration of an image projecting device 1501 according to a 13th embodiment of the present invention.

In the present embodiment, the optical system as shown in FIG. 9 is used as a projecting optical system in the image projecting device 1501.

As shown in FIG. 14, in the image projecting device 1501, incident light modulated based on input image data is projected with a projecting lens 1109, and images are displayed on a display unit, namely, a screen 1502.

Since the projecting optical system of the image projecting device 1501 includes actuators each having a small contacting part, it is possible to obtain an inexpensive and high-definition image projecting device.

14th Embodiment

Figure 15:
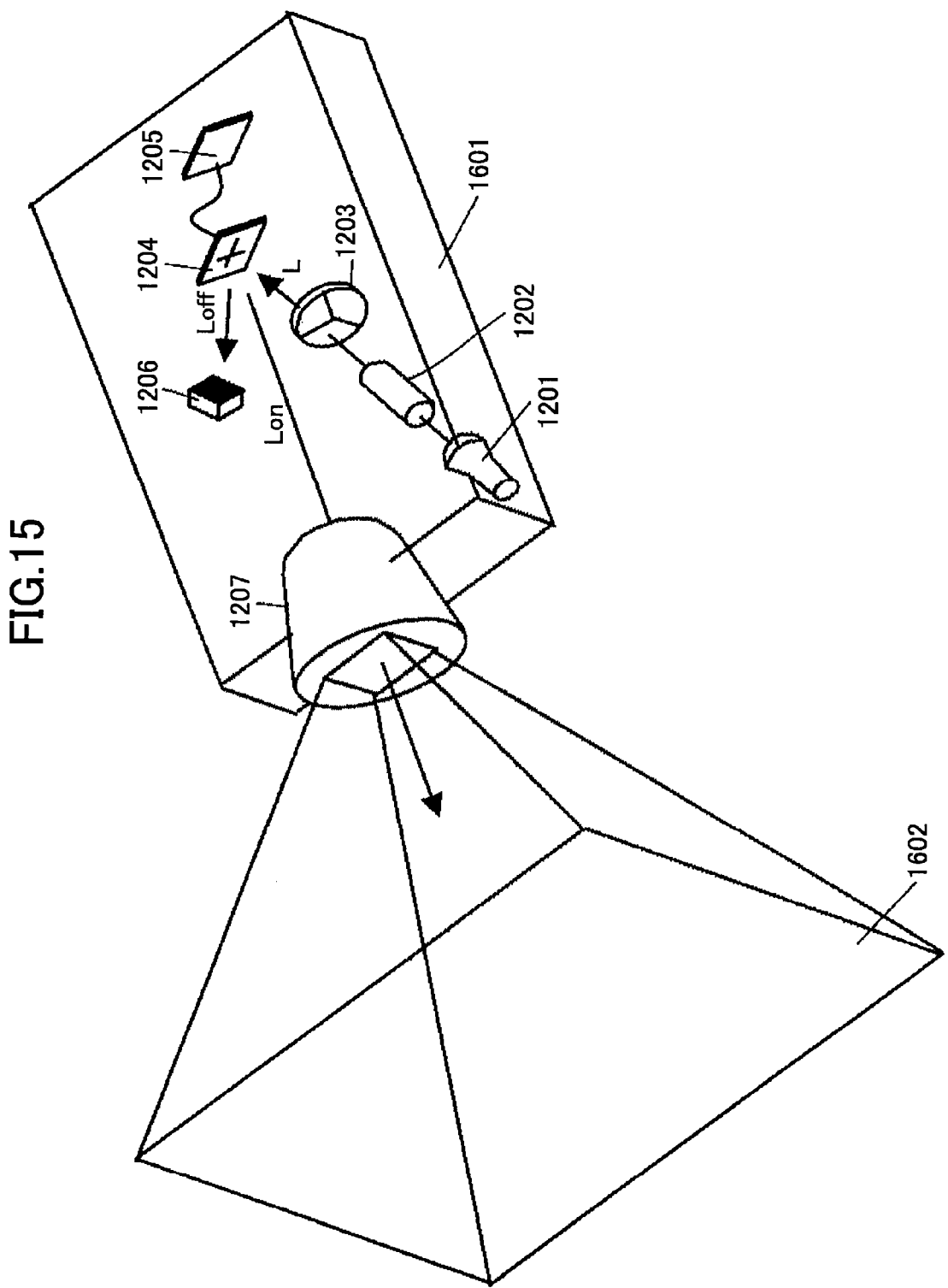
FIG. 15 is a schematic view illustrating a configuration of an image projecting device 1601 according to a 14th embodiment of the present invention.
Figure 16A:
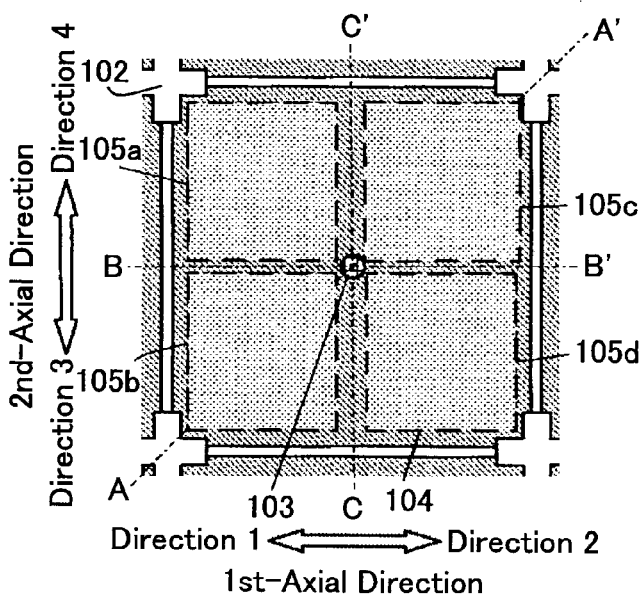
FIG. 16A through FIG. 16D are a plan view and cross-sectional views illustrating a structure of a light deflection device in the related art.
Figure 16B:
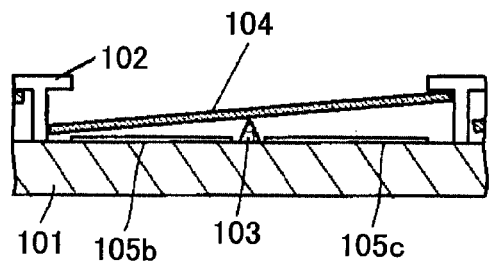
Figure 16C:
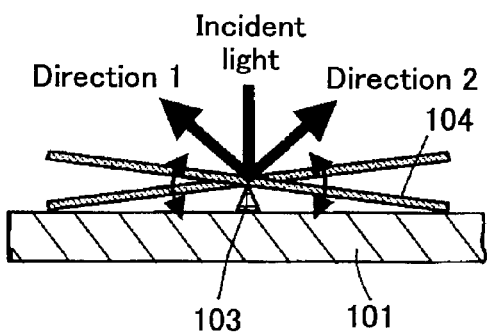
Figure 16D:
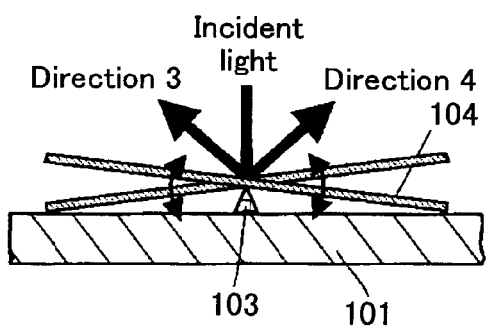
Figure 18A:
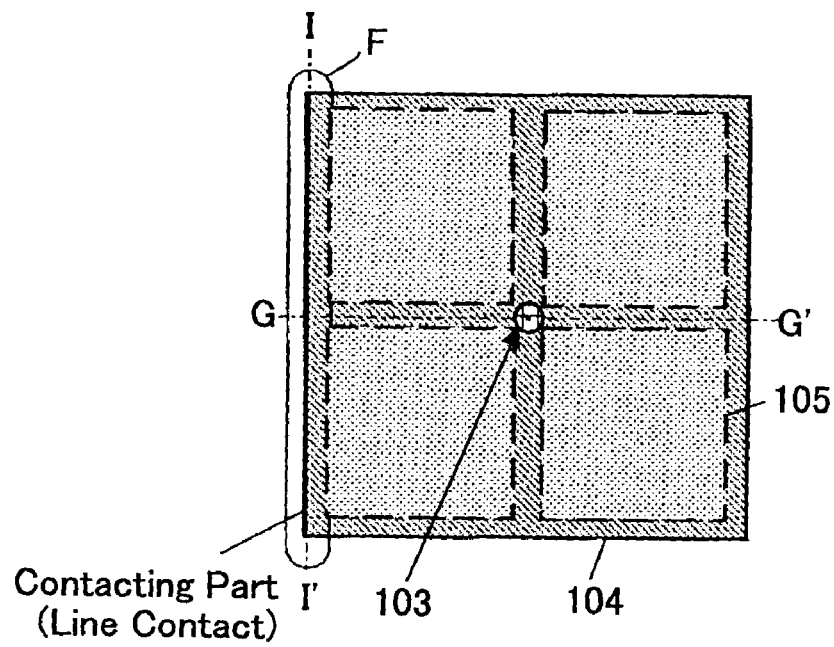
FIG. 18A through FIG. 18C are a schematic plan view and schematic cross-sectional views illustrating a portion of the light deflection device in the related art for explaining contacting of the plate member 104.
Figure 18B:
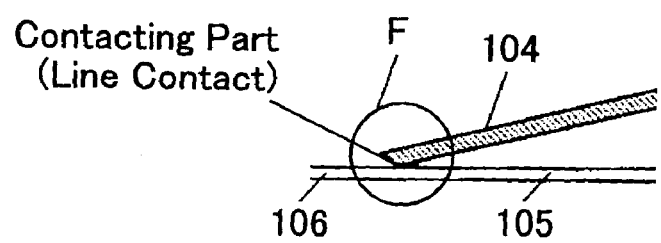
Figure 18C:
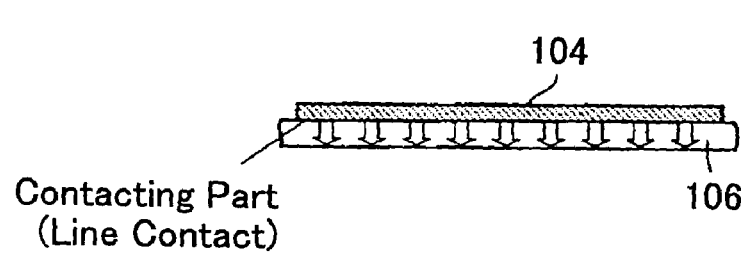

FIG. 15 is a schematic view illustrating a configuration of an image projecting device 1601 according to a 14th embodiment of the present invention.

In the present embodiment, the optical system as shown in FIG. 10 is used as a projecting optical system in the image projecting device 1601.

As shown in FIG. 15, in the image projecting device 1601, incident light modulated based on input image data is projected with a projecting lens 1207, and images are displayed on a display unit, namely, a screen 1602.

Since the projecting optical system of the image projecting device 1601 includes actuators each having a small contacting part, it is possible to obtain an inexpensive and high-definition image projecting device.

15th Embodiment

In the 15th embodiment, in addition to the features disclosed in the first and second embodiments, in the actuator, the supporting member 103 is formed by overlapping two layers, and a contacting part of the supporting member 103 corresponds to an overlapping portion of the two layers.

Further, in the actuator, the patterns of the two layers of the supporting member 103 are a rectangle, and the contacting part of the supporting member 103 corresponds to a portion where a long-side of one layer intersects with a long-side of the other layer.

FIG. 19A through FIG. 19D are a plan view and cross-sectional views illustrating a structure of a light deflection device according to the 15th embodiment of the present invention.

Figure 19A:
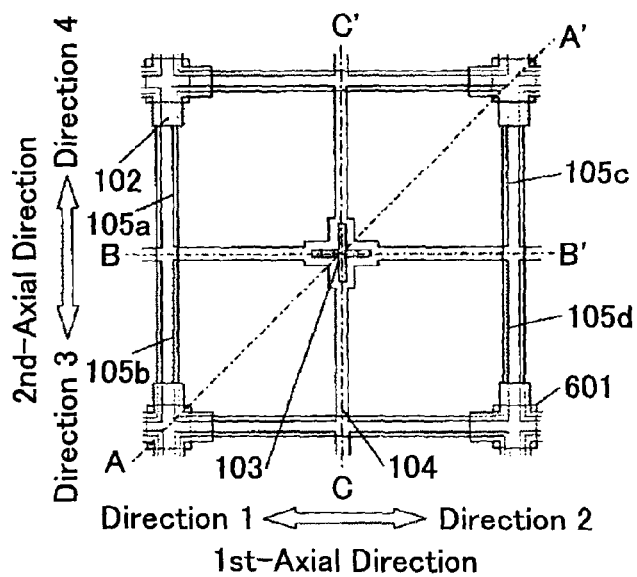
FIG. 19A through FIG. 19D are a plan view and cross-sectional views illustrating a structure of a light deflection device according to a 15th embodiment of the present invention.
Figure 19B:
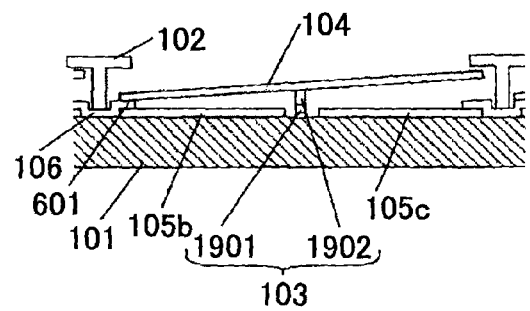
Figure 19C:
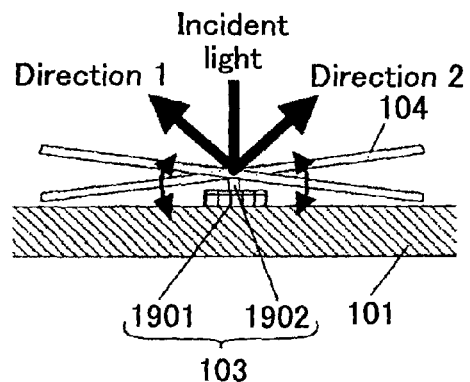
Figure 19D:
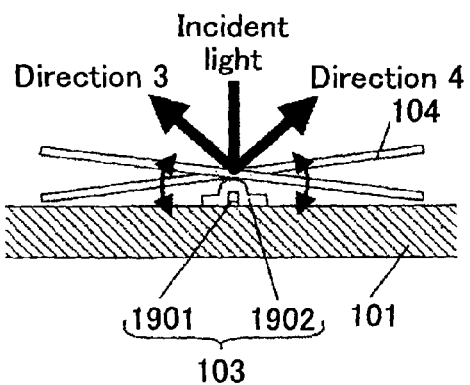

Specifically, FIG. 19A is a plan view of the light deflection device, FIG. 19B is a cross-sectional view along an AA' line in FIG. 19A, FIG. 19C is a cross-sectional view along a BB' line in FIG. 19A, and FIG. 19D is a cross-sectional view along a CC' line in FIG. 19A.

Note that the light deflection device shown in FIG. 19A through FIG. 19D corresponds to one actuator of a two dimensional light deflecting array including plural actuators.

In the light deflection device shown in FIG. 19A through FIG. 19D, a contacting voltage is applied on the plate member 104 (for example, a mirror), and the light deflection device is able to deflect the incident light along two axes in four directions.

As shown in FIG. 19A through FIG. 19D, the light deflection device includes a substrate 101, plural regulation members 102, a supporting member 103, a plate member 104, and plural electrodes 105a, 105b, 105c, and 105d.

The regulation members 102 are arranged at corners of the substrate 101, respectively, and each of the regulation members 102 has a stopper at its top.

The supporting member 103 is a stacked structure including a conductive lower member 1901 and a conductive upper member 1902, and the conductive upper member 1902 is in the same layer as the electrodes 105a, 105b, 105c, and 105d. The supporting member 103 is arranged on the surface of the substrate 101, and the upper surface of the supporting member 103 is in contact with the plate member 104.

The plate member 104 does not have a fixed end, namely, the plate member 104 is not fixed. On the upper portion of the plate member 104, there are a light reflecting area and a conductive layer formed of a member with at least a conductive part. At the bottom of the plate member 104, at least a contacting part, which is in contact with the top of the supporting member 103, is formed of a conductive member. The plate member 104 is movably arranged in the space surrounded by the substrate 101, the supporting member 103, and the stoppers of the regulation members 102. A voltage on the plate member 104 is supplied through contacting with the supporting member 103.

The electrodes 105a, 105b, 105c, and 105d are arranged on the substrate 101, and are substantially opposite to the conductive layer of the plate member 104.

A contacting part 601 is formed by overlapping an insulating film 106 on ends of patterns of the electrodes 105a, 105b, 105c, and 105d, and the contacting part 601 is smaller than a processing limit of the lithography technique, as described in the first and second embodiments.

The conductive lower member 1901 of the supporting member 103 has a rectangular shape when viewed from the top of the actuator (refer to FIG. 19A). The conductive upper member 1902 also has a rectangular shape when viewed from the top, and the conductive upper member 1902 is perpendicular to the conductive lower member 1901. That is, the conductive upper member 1902 overlaps on the conductive lower member 1901, thereby forming a contacting part of the supporting member 103, which contacting part of the supporting member 103 is smaller than a processing limit of the lithography technique.

In the light deflection device of the present embodiment, by an appropriate combination of voltages applied on the electrodes 105a, 105b, 105c, 105d, and the supporting member 103, as shown in FIG. 19C and FIG. 19D, the plate member 104 is inclined in four directions, namely, "direction 1", "direction 2", "direction 3", and "direction 4" in FIG. 19C and FIG. 19D. Therefore, for example, when a light beam is incident in a direction perpendicular to the surface of the substrate 101, the plate member 104 reflects the incident light beam in the four directions. On the contrary, when at most four light beams are incident respectively in the four directions, the plate member 104 reflects the incident light beams in the direction perpendicular to the surface of the substrate 101.

Since both the contacting part 601 and the contacting part of the supporting member 103 are smaller than the processing limit of the lithography technique, the light deflection device can be made small. It is therefore possible to prevent the plate member (for example, a mirror) from being fixed, and to drive the actuator at a low voltage.

Figure 20A:
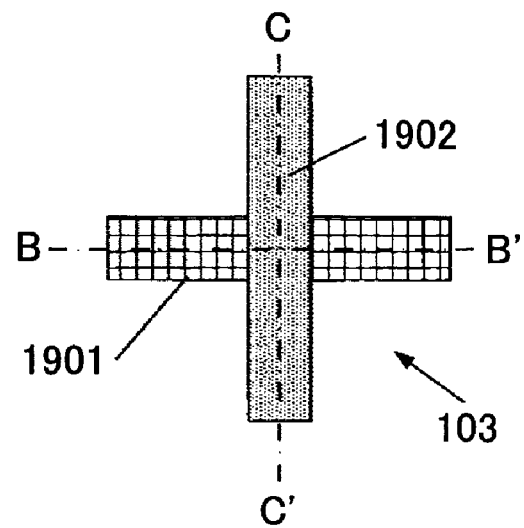
FIG. 20A through FIG. 20C are a plan view and cross-sectional views illustrating the supporting member 103 of the 15th embodiment.
Figure 20B:
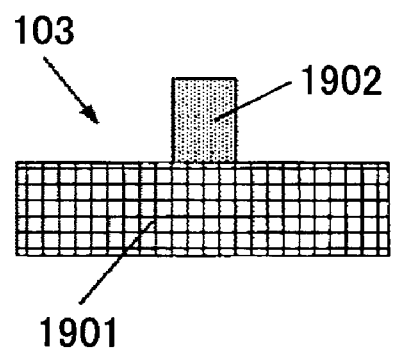
Figure 20C:
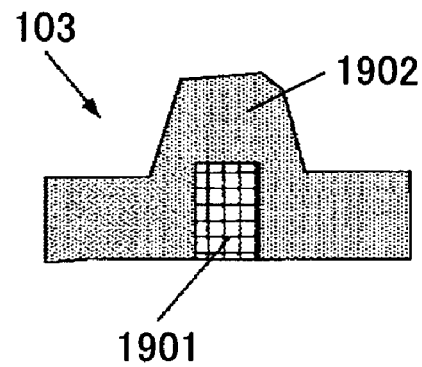

FIG. 20A through FIG. 20C are a plan view and cross-sectional views illustrating the supporting member 103 of the present embodiment.

Specifically, FIG. 20A is a plan view of the supporting member 103 of the present embodiment, FIG. 20B is a cross-sectional view along a BB' line in FIG. 20A, and FIG. 20C is a cross-sectional view along a CC' line in FIG. 20A.

As shown in FIG. 20A through FIG. 20C, the supporting member 103 is formed by overlapping the upper member 1902 on the lower member 1901, and the overlapping portion of the upper member 1902 on the lower member 1901 constitutes the contacting part of the supporting member 103. The upper member 1902 and the lower member 1901 are rectangular, and the contacting part of the supporting member 103 corresponds to the portion where the upper member 1902 intersects with the lower member 1901.

Figure 21A:
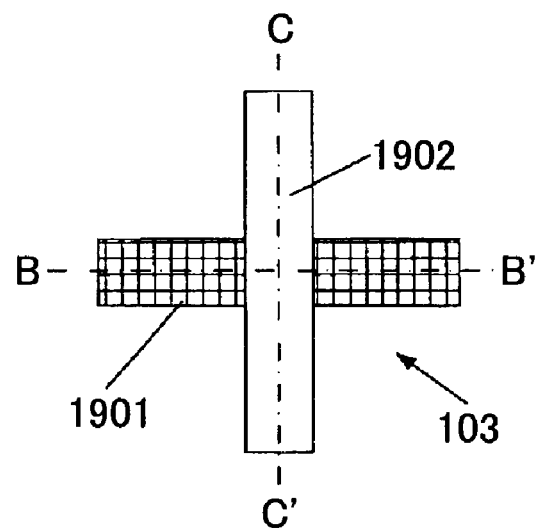
FIG. 21A through FIG. 21C are a plan view and cross-sectional views illustrating another example of the supporting member 103 of the 15th embodiment.
Figure 21B:
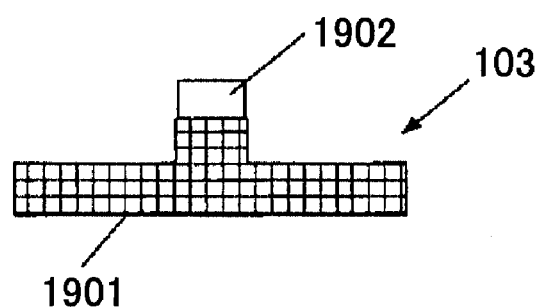
Figure 21C:
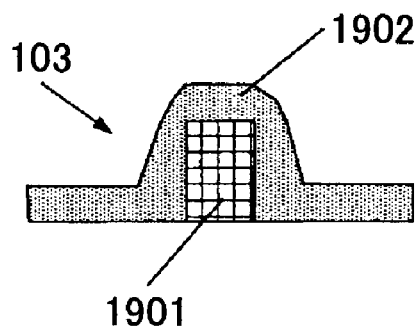

FIG. 21A through FIG. 21C are a plan view and cross-sectional views illustrating another example of the supporting member 103 of the present embodiment.

Specifically, FIG. 21A is a plan view of the supporting member 103 of the present embodiment, FIG. 21B is a cross-sectional view along a BB' line in FIG. 21A, and FIG. 21C is a cross-sectional view along a CC' line in FIG. 21A.

In the example shown in FIG. 21A through FIG. 21C, the upper member 1902 and the lower member 1901 are formed of the same metal, or similar metals. Thus, when patterning the upper member 1902, which is at the upper position, the lower member 1901, which is at the lower position, is also etched to a certain depth; therefore, the contacting part of the supporting member 103 is more projected.

In a common light deflection device, the contacting part of the supporting member 103 constantly contacts the plate member 104 (for example, a mirror), and, similar to the contacting part 601, the constant contact between the supporting member 103 and the plate member 104 may fix the plate member 104 (contact fixing). This contact fixing in turn impedes motion of the plate member 104, and results in an increase of the driving voltage of the actuator.

To solve this problem, it is attempted to reduce the size of the upper surface of the supporting member 103 as much as possible; for example, it is ideal that the upper surface of the supporting member 103 be reduced to a point. However, when using a general lithography device, like a common i-line stepper, it is difficult to reduce the size of an object to a level less than the processing limit.

For example, when fabricating a supporting member having an upper surface of a diameter in a range from 0.3 μm to 0.6 μm, it is required to form a cylindrical column having a diameter in the range from 0.3 μm to 0.6 μm as a resist used as an etching mask. However, since this size is so small and equivalent to the size of particles (foreign matter) drifting inside or outside the processing device, with usual lithography techniques, diffracting light or reflecting light during exposure cannot distinguish the particles and the etching mask.

In contrast, in the present embodiment, for example, the rectangular lower member 1901 and the rectangular upper member 1902 have short-sides of 0.4 μm and 1.5 μm. When the rectangular lower member 1901 and the rectangular upper member 1902 are overlapped in their long-side direction, the contacting part of the supporting member 103, that is, the overlapping portion of the rectangular lower member 1901 and the rectangular upper member 1902, is nearly a square, and each side thereof is about 0.4 μm. It should be noted that the rectangular pattern of the lower member 1901 and the upper member 1902 having the above dimensions can be easily fabricated by using a general lithography device, like a common i-line stepper. For example, it is well known that a gate electrode of a semiconductor device having the above dimensions can be fabricated by using a common i-line stepper, or other general lithography device.

Therefore, according to the present embodiment, it is possible to form a fine contacting part of the supporting member 103.

FIG. 22A through FIG. 22I are cross-sectional views exemplifying a method of producing the light deflection device (actuator) as shown in FIG. 19A through FIG. 19D which has the fine contacting part 601 and the fine contacting part of the supporting member 103.

Specifically, FIG. 22A through FIG. 22I are cross-sectional views along an AA' line in FIG. 19A.

Figure 22A:
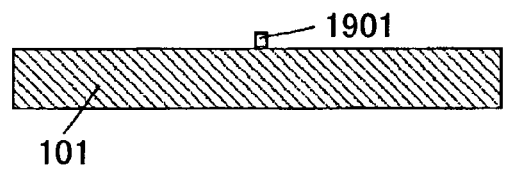
FIG. 22A through FIG. 22I are cross-sectional views exemplifying a method of producing the light deflection device (actuator) as shown in FIG. 19A through FIG. 19D which has the fine contacting part 601 and the fine contacting part of the supporting member 103.

In the step shown in FIG. 22A, an aluminum-based alloy film for forming the lower member 1901 of the supporting member 103 is deposited on the substrate 101 by DC magnetron sputtering. Then a resist pattern is formed by i-line stepper lithography, and the lower member 1901 of the supporting member 103 is then patterned by dry etching to have a rectangular shape.

Here, for example, the substrate 101 is a silicon substrate, and a silicon oxide film (not illustrated) is formed to cover the entire surface of the substrate 101.

Figure 22B:
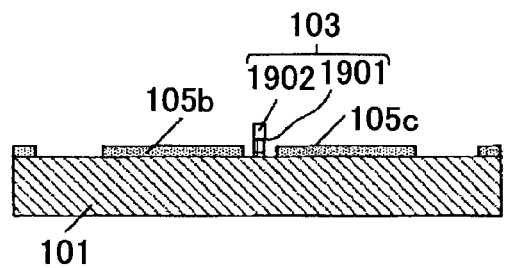

In the step shown in FIG. 22B, the electrodes 105a, 105b, 105c, and 105d, and the upper member 1902 of the supporting member 103 are formed of a titanium nitride (TiN) thin film. Specifically, the TiN thin film is formed by reactive sputtering by using a titanium target, and the electrodes 105a, 105b, 105c, and 105d, and the upper member 1902 of the supporting member 103 are patterned by i-line stepper lithography and dry etching. These electrodes 105a, 105b, 105c, and 105d also serve as one of the layers constituting the fine contacting part 601.

The upper member 1902 of the supporting member 103 is patterned to be a rectangle perpendicular to the lower member 1901.

It should be noted that in FIG. 22B, only the electrodes 105b and 105c are illustrated.

Figure 22C:
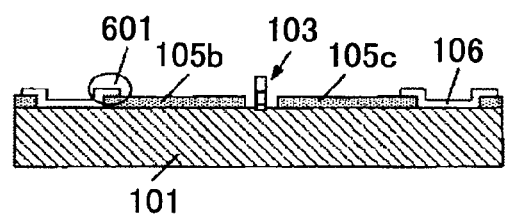

In the step shown in FIG. 22C, a silicon oxide film is formed by plasma CVD, which serves as the insulating film 106, that is, one constituent layer of the fine contacting part 601. Then, the insulating film 106 is patterned by stepper lithography and dry etching.

In this step, the end of the pattern of the insulating film 106 is superposed on the ends of the patterns of the electrodes 105a, 105b, 105c, and 105d, and the resulting overlapping part constitutes the fine contacting part 601.

Figure 22D:
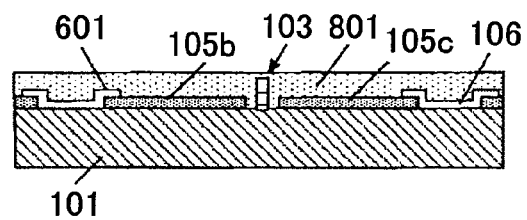

In the step shown in FIG. 22D, a flat organic film of heat-resistance is formed by spin-coating, and after that, the organic film is hardened by heat treatment. This organic film is referred to as a first sacrifice film 801. It should be noted that a poly-crystal silicon film may be used as the first sacrifice film 801 instead of the above organic film.

Figure 22E:
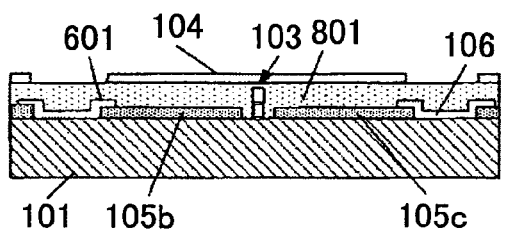

In the step shown in FIG. 22E, an aluminum-based alloy film used for the plate member 104 is deposited by DC magnetron sputtering and is then patterned. The plate member 104 is formed of a stacked structure of a layer of high light-reflectivity and a layer of high elasticity and rigidity, and also has functions of a conductive layer.

Figure 22F:
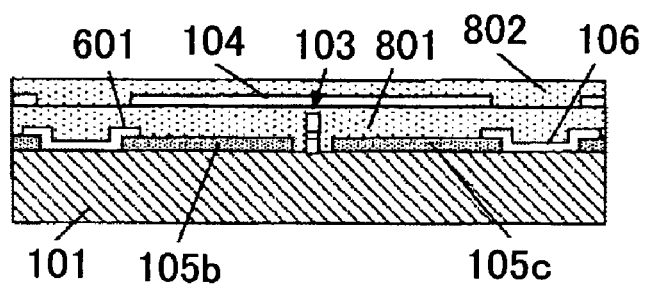

In the step shown in FIG. 22F, another flat organic film of heat-resistance is formed by spin-coating again, and after that, the organic film is hardened by heat treatment. This organic film is referred to as a second sacrifice film 802. It should be noted that a poly-crystal silicon film may be used as the second sacrifice film 802 instead of the organic film.

Figure 22G:
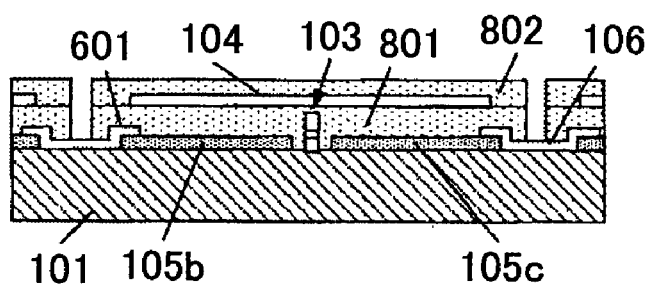

In the step shown in FIG. 22G, the substrate including the structure formed so far is divided into plural separate light deflection devices. In order to form the stoppers of the regulation members 102, openings serving as slits or holes are formed and are patterned in the first sacrifice film 801 and the second sacrifice film 802 simultaneously by stepper lithography and dry etching.

Figure 22H:
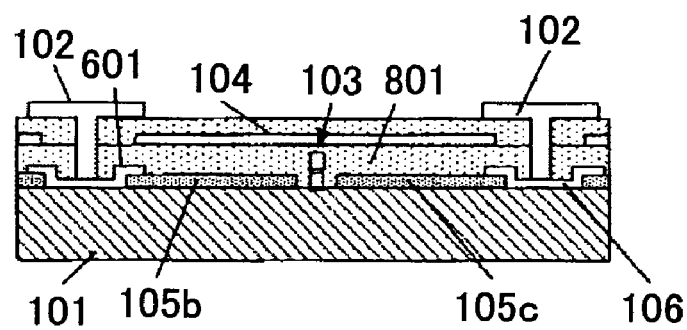

In the step shown in FIG. 22H a silicon oxide film is formed by plasma CVD, which serves as the regulation members 102 having stoppers. Then, the silicon oxide film is patterned by stepper lithography and dry etching.

It should be noted that the arrangement of the regulation members 102 having stoppers is not limited to that shown in FIG. 22H, but can be arranged at any other positions as long as the regulation members 102 are able to confine the plate member 104 into a specified space.

Figure 22I:
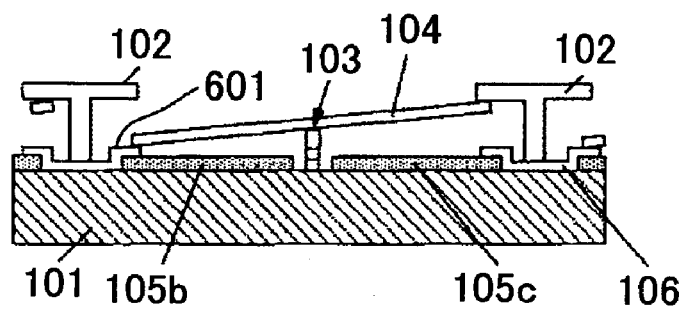

In the step shown in FIG. 22I, the residual first sacrifice film 801 and the residual second sacrifice film 802 are removed by plasma etching through the openings, and thereby, the plate member 104 is located in a space which limits the movable range of the plate member 104. In this way, the light deflection device (actuator) as shown in FIG. 19A through FIG. 19D is fabricated.

When etching the sacrifice films, depending on types of the sacrifice films, not only dry etching but also wet etching can be used. In addition, since etching of the sacrifice films proceeds in the surface direction of the substrate, the plate member 104 is exposed in the etching environment when etching the sacrifice films. For this reason, it is important that appropriate materials resistant against etching be selected for the plate member 104.

It should be noted that in the method illustrated in FIG. 22A through FIG. 22I, a voltage supplying line for supplying a voltage to the electrodes 105a, 105b, 105c, and 105d, and the supporting member 103 is omitted.

According to the above embodiments, since the actuator has a contacting part of a size less than a resolving power or resolution of a semiconductor process or a semiconductor process processing device, it is possible to prevent the operation part from being fixed, and it is possible to drive the actuator at a low voltage.

In addition, a deflection angle of the plate member can be controlled easily and stably, and the response speed is high. Further, long-term degradation can hardly occur, and it is possible to improve the ratio of the reflected light on an ON condition and the reflected light on an OFF condition (namely, the S/N ratio in a still image device, or a contrast ratio in a video device). Further, it is possible to reduce the size of the actuator and increase the degree of integration at low cost, and it is possible to perform one-axis two-dimensional light deflection and two-axis three-dimensional light deflection. Furthermore, it is possible to prevent the mirror from being fixed, and it is possible to drive the actuator at a low voltage.

In addition, since one or more layers of the contacting part are also used as the layer for forming the electrodes, fabrication cost can be lowered.

In addition, since a small supporting part can be formed, the contacting area can be reduced greatly; thus the sticking force induced by contact can be reduced sufficiently, and a driving voltage of the actuator can be decreased.

In addition, since the resolving power or resolution of a short-side of a rectangular pattern is higher than a square pattern, with rectangular patterns intersecting each other, it is possible to form a small contacting part of the supporting member; thus the contacting area can be reduced greatly, the sticking force induced by contact can be reduced sufficiently, and a driving voltage of the actuator can be decreased.

In addition, since each actuator corresponding to one pixel can be driven at a low voltage, a small, highly-integrated, and low driving voltage memory circuit can be used as a semiconductor memory circuit in the actuator for storing image data; hence it is possible to make the actuator array small and highly-integrated, thereby realizing a small optical system.

In addition, since an inexpensive and high-definition light writing unit is used, it is possible to obtain an inexpensive and high-definition image forming device. Further, since an inexpensive and high-definition display unit is used, it is possible to obtain an inexpensive and high-definition image projection device.

The present invention further includes the following embodiments.

A1. An optical system, comprising:
an actuator array that includes a plurality of actuators arranged in one dimension or two dimensions;
a light source that emits light onto the actuator array; and
a projecting lens that projects light reflected from the actuator array according to image data,
wherein
each of the actuators includes
an operating part; and
a contacting part that is in contact with the operating part, said contacting part being formed by overlapping a first pattern on an end of a second pattern, said first pattern having a solid structure, a size of an upper portion of the solid structure of the first pattern on the second pattern being less than a processing resolving power or resolution.

A2. An image forming device, comprising:
a light writing unit that includes an optical system, said optical system including an actuator array having a plurality of actuators arranged in one dimension or two dimensions, a light source for emitting light onto the actuator array, and a projecting lens for projecting light reflected from the actuator array according to image data,
wherein
each of the actuators includes
an operating part; and
a contacting part that is in contact with the operating part, said contacting part being formed by overlapping a first pattern on an end of a second pattern, said first pattern having a solid structure, a size of an upper portion of the solid structure of the first pattern on the second pattern being less than a processing resolving power or resolution.

A3. An image projecting device, comprising:
a display unit that includes an optical system, said optical system including an actuator array having a plurality of actuators arranged in one dimension or two dimensions, a light source for emitting light onto the actuator array, and a projecting lens for projecting light reflected from the actuator array according to image data,
wherein
each of the actuators includes
an operating part; and
a contacting part that is in contact with the operating part, said contacting part being formed by overlapping a first pattern on an end of a second pattern, said first pattern having a solid structure, a size of an upper portion of the solid structure of the first pattern on the second pattern being less than a processing resolving power or resolution.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2006-196015 filed on Jul. 18, 2006, and No. 2007-030907 filed on Feb. 9, 2007, the entire contents of which are hereby incorporated by reference.

What is claimed is:
1. An actuator, comprising:
an operating part;
a contacting part that is in contact with the operating part, said contacting part being formed by overlapping a first pattern on an end of a second pattern, and said first pattern having a solid structure;
a substrate;
a plurality of regulation members that are arranged at corners of the substrate, respectively, each of said regulation members having a stopper at a top thereof;
a supporting member that has a top part, and is arranged on the surface of the substrate;

a plate member that acts as the operating part, and does not have a fixed end, said plate member including a light reflecting area, a conductive layer formed of a member having a conductive portion, said plate member being movably arranged in a space among the substrate, the supporting member, and the stoppers of the regulation members; and a plurality of electrodes that are arranged on the substrate, and nearly opposite to the conductive layer of the plate member, wherein:

the contacting part is formed by overlapping two or more layers, the contacting part corresponds to an overlapping portion of an end of a pattern of one of the two or more layers and an end of a pattern of another one of the two or more layers, and the plate member is inclined by an electrostatic attractive force with the supporting member as a center to deflect light incident onto the light reflecting area.

2. The actuator as claimed in claim 1, wherein at least one of the two or more layers of the contacting part corresponds to a layer forming the electrodes.

3. The actuator as claimed in claim 2, wherein the supporting member is formed by overlapping two or more layers, and a contacting part of the supporting member corresponds to an overlapping portion of patterns of the two or more layers.

4. The actuator as claimed in claim 3, wherein each of the patterns of the two or more layers is a rectangle, and the contacting part of the supporting member corresponds to a portion where a long-side of one of the two or more layers intersects with a long-side of another one of the two or more layers.

5. An actuator array, comprising:

a plurality of actuators arranged in one dimension or two dimensions, wherein each of the actuators includes:

an operating part;

a contacting part that is in contact with the operating part, said contacting part being formed by overlapping a first pattern on an end of a second pattern, and said first pattern having a solid structure;

a substrate;

a plurality of regulation members that are arranged at corners of the substrate, respectively, each of said regulation members having a stopper at a top thereof;

a supporting member that has a top part, and is arranged on the surface of the substrate;

a plate member that acts as the operating part, and does not have a fixed end, said plate member including a light reflecting area, a conductive layer formed of a member having a conductive portion, said plate member being movably arranged in a space among the substrate, the supporting member, and the stoppers of the regulation members; and a plurality of electrodes that are arranged on the substrate, and are nearly opposite to the conductive layer of the plate member, wherein:

the contacting part is formed by overlapping two or more layers, the contacting part corresponds to an overlapping portion of an end of a pattern of one of the two or more layers and an end of a pattern of another one of the two or more layers, and the plate member is inclined by an electrostatic attractive force with the supporting member as a center to deflect light incident onto the light reflecting area.

6. The actuator array as claimed in claim 5, wherein at least one of the two or more layers of the contacting part corresponds to a layer forming the electrodes.

* * * * *